United States Patent
Kim et al.

(10) Patent No.: US 9,312,963 B2
(45) Date of Patent: Apr. 12, 2016

(54) OPTICAL TRANSMISSION CONVERTER, MEMORY SYSTEM COMPRISING SAME, AND RELATED METHOD OF OPERATION

(71) Applicant: SAMSUNG ELECTRONICS CO., LTD., Suwon-Si, Gyeonggi-Do (KR)

(72) Inventors: Jeong-Kyoum Kim, Seoul (KR); Seok-Hun Hyun, Seongnam-si (KR); In-Dal Song, Seoul (KR); Seong-Jin Jang, Seongnam-si (KR); Jung-Hwan Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/552,601

(22) Filed: Nov. 25, 2014

(65) Prior Publication Data

US 2015/0147068 A1    May 28, 2015

(30) Foreign Application Priority Data

Nov. 26, 2013 (KR) .................. 10-2013-0144819

(51) Int. Cl.
| | |
|---|---|
| *H04B 10/50* | (2013.01) |
| *H04B 10/80* | (2013.01) |
| *H04B 10/67* | (2013.01) |
| *H04B 10/572* | (2013.01) |
| *H04J 14/00* | (2006.01) |
| *H04J 14/02* | (2006.01) |

(52) U.S. Cl.
CPC ............ *H04B 10/572* (2013.01); *H04B 10/506* (2013.01); *H04B 10/671* (2013.01); *H04B 10/801* (2013.01); *H04J 14/0278* (2013.01)

(58) Field of Classification Search
CPC .. H04B 10/506; H04B 10/572; H04B 10/671; H04B 10/801; H04J 14/0278
USPC .................. 398/182, 164, 138, 135
See application file for complete search history.

(56) References Cited

U.S. PATENT DOCUMENTS

| | | | |
|---|---|---|---|
| 6,793,408 | B2 | 9/2004 | Levy et al. |
| 7,272,312 | B2* | 9/2007 | Sato .................. H04Q 11/0005 398/47 |
| 7,417,884 | B2 | 8/2008 | Ogawa et al. |
| 7,970,990 | B2 | 6/2011 | Forrest et al. |
| 9,054,805 | B2* | 6/2015 | Ji ............................ H04B 10/25 |
| 2004/0126115 | A1 | 7/2004 | Levy et al. |
| 2004/0257890 | A1 | 12/2004 | Lee et al. |
| 2005/0169633 | A1* | 8/2005 | Nakagawa ............ H04B 10/572 398/85 |
| 2008/0077731 | A1 | 3/2008 | Forrest et al. |
| 2011/0134679 | A1 | 6/2011 | Suh et al. |
| 2011/0231618 | A1 | 9/2011 | Baker et al. |
| 2013/0254495 | A1* | 9/2013 | Kim .................... G06F 13/1663 711/150 |

\* cited by examiner

*Primary Examiner* — Dalzid Singh
(74) *Attorney, Agent, or Firm* — Volentine & Whitt, PLLC

(57) ABSTRACT

An optical transmission converter comprises a wavelength selector configured to output a reception wavelength selection signal and a transmission wavelength selection signal in response to a wavelength control signal, an opto-electrical converter configured to convert a selection optical signal into a reception electrical signal based on a reception optical signal from a host device and the reception wavelength selection signal, and an electro-optical converter configured to convert a transmission electrical signal into a transmission optical signal based on the transmission wavelength selection signal and the transmission electrical signal.

20 Claims, 21 Drawing Sheets

FIG. 22

| WAVELENGTH # | OPTICAL SPEED/FIBER | ELECTRICAL SPEED | GEAR RATIO |
|---|---|---|---|
| 6( λ0~λ5) | 11.4Gb/s | 1.066Gb/s (x64) | 12:1 |
| 9( λ0~λ8) | 11.4Gb/s | 1.600Gb/s (x64) | 8:1 |
| 12( λ0~λ11) | 11.4Gb/s | 2.133Gb/s (x64) | 6:1 |

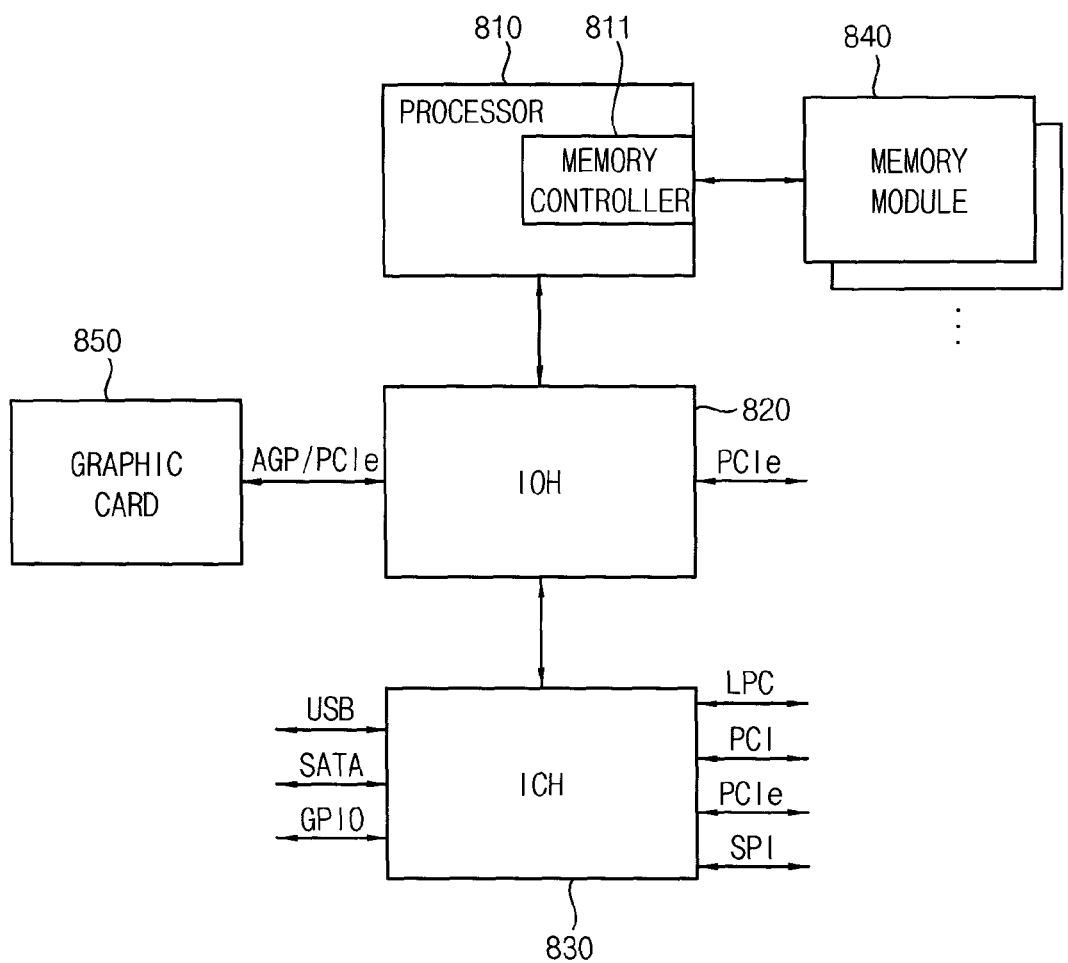

OPTICAL TRANSMISSION CONVERTER, MEMORY SYSTEM COMPRISING SAME, AND RELATED METHOD OF OPERATION

CROSS-REFERENCE TO RELATED APPLICATION

This application claims priority under 35 USC §119 to Korean Patent Application No. 10-2013-0144819 filed on Nov. 26, 2013, the subject matter of which is hereby incorporated by reference.

BACKGROUND OF THE INVENTION

Embodiments of the inventive concept relate generally to a memory technologies, and more particularly to an optical transmission converter and a memory system comprising the optical transmission converter.

Due to ever increasing performance demands of modern electronic devices, researchers are constantly seeking new ways to improve the speed of operations performed by semiconductor devices such as application processors, memory devices, display devices, and so on. One recent approach for improving performance involves the use of optical transmission to communicate signals within and/or between components. The use of optical transmission may allow communication of large amounts of information at a relatively high rate.

SUMMARY OF THE INVENTION

In one embodiment of the inventive concept, an optical transmission converter comprises a wavelength selector configured to output a reception wavelength selection signal and a transmission wavelength selection signal in response to a wavelength control signal, an opto-electrical converter configured to convert a selection optical signal into a reception electrical signal based on a reception optical signal from a host device and the reception wavelength selection signal, and an electro-optical converter configured to convert a transmission electrical signal into a transmission optical signal based on the transmission wavelength selection signal and the transmission electrical signal.

In another embodiment of the inventive concept, a memory system comprises a host device comprising an electro-optical converting device that converts a command, an address, and data to an optical signal, and multiple slave devices comprising an optical transmission converter that converts the optical signal to an electrical signal. The optical transmission converter comprises a wavelength selector that outputs a reception wavelength selection signal and a transmission wavelength selection signal in response to a wavelength control signal, an opto-electrical converter that converts a selection optical signal to a reception electrical signal based on a reception optical signal corresponding to the command, the address and the data from a host device and the reception wavelength selection signal, and an electro-optical converter that converts a transmission electrical signal to a transmission optical signal based on the transmission wavelength selection signal and the transmission electrical signal.

In still another embodiment of the inventive concept, a method comprises outputting, by a wavelength selector, a reception wavelength selection signal and a transmission wavelength selection signal in response to a wavelength control signal, converting, by an opto-electrical converter, a selection optical signal into a reception electrical signal based on a reception optical signal from a host device and the reception wavelength selection signal, and converting, by an electro-optical converter, a transmission electrical signal into a transmission optical signal based on the transmission wavelength selection signal and the transmission electrical signal.

These and other embodiments of the inventive concept can potentially improve the efficiency of optical transmission conversion compared to conventional approaches.

BRIEF DESCRIPTION OF THE DRAWINGS

The drawings illustrate selected embodiments of the inventive concept. In the drawings, like reference numbers indicate like features.

FIG. 22 is a diagram illustrating a data transmission speed according to a number of wavelengths.

FIG. 23 is a block diagram illustrating a computing system comprising a memory system according to an embodiment of the inventive concept.

DETAILED DESCRIPTION

Embodiments of the inventive concept are described below with reference to the accompanying drawings. These embodiments are provided as teaching examples and should not be construed to limit the scope of the inventive concept.

In the description that follows, the terms first, second, third etc. may be used to describe various features, but these features should not be limited by these terms. Rather, these terms are used merely to distinguish one feature from another. Thus, a first feature discussed below could be termed a second feature, and vice versa, without materially altering the meaning of the relevant description. As used herein, the term "and/or" includes any and all combinations of one or more of the associated listed items.

Where a feature is referred to as being "connected" or "coupled" to another feature, it may be directly connected or coupled to the other feature or intervening features may be present. In contrast, where a feature is referred to as being "directly connected" or "directly coupled" to another feature, there are no intervening features present. Other words used to describe the relationship between features should be interpreted in a like fashion (e.g., "between" versus "directly between," "adjacent" versus "directly adjacent," etc.).

The terminology used herein is for the purpose of describing example embodiments only and is not intended to limit the inventive concept. As used herein, the singular forms "a," "an" and "the" are intended to include the plural forms as well, unless the context clearly indicates otherwise. Terms such as "comprises", "comprising", "includes", "including", etc., where used herein, indicate the presence of stated features but do not preclude the presence or addition of other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and will not be interpreted in an idealized or overly formal sense unless expressly so defined herein.

Figure 1:
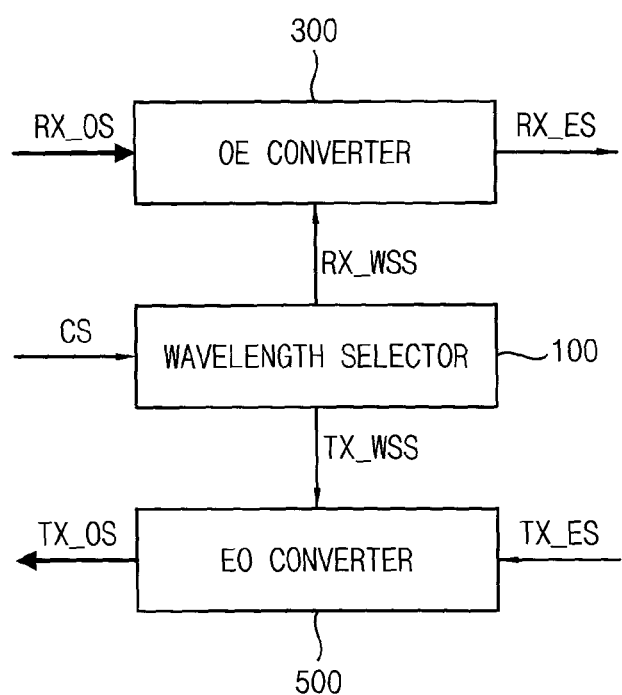
FIG. 1 is a block diagram illustrating an optical transmission converter according to an embodiment of the inventive concept.
Figure 2:
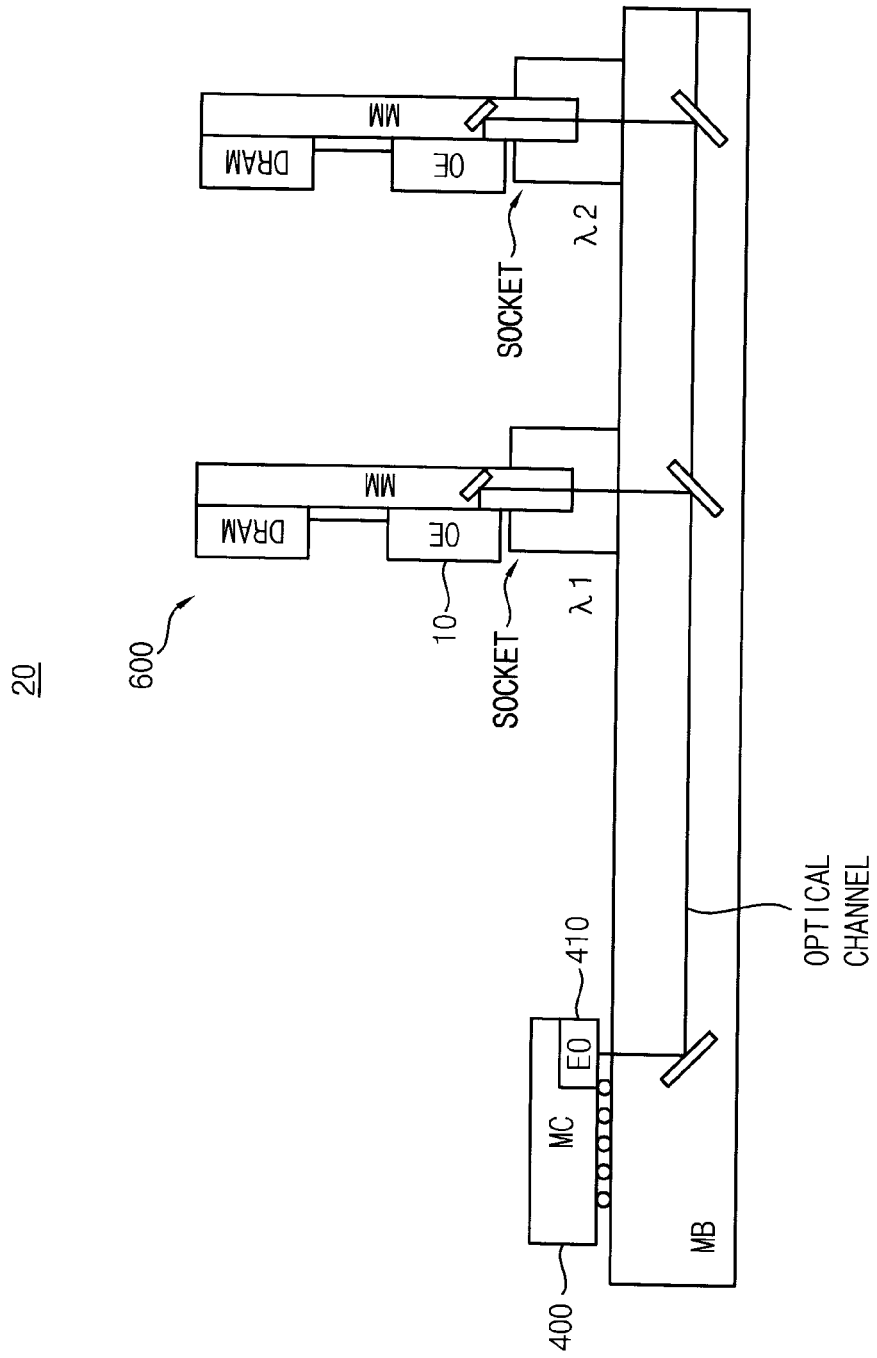
FIG. 2 is a block diagram illustrating a memory system comprising the optical transmission converter of FIG. 1, according to an embodiment of the inventive concept.

FIG. 1 is a block diagram illustrating an optical transmission converter according to an embodiment of the inventive concept, and FIG. 2 is a block diagram illustrating a memory system comprising the optical transmission converter of FIG. 1, according to an embodiment of the inventive concept.

Referring to FIG. 1, an optical transmission converter 10a comprises a wavelength selector 100, an opto-electrical converter and an electro-optical converter 500. Wavelength selector 100 generates a reception wavelength selection signal RX_WSS and a transmission wavelength selection signal TX_WSS in response to a wavelength control signal CS. Wavelength selector 100 controls the opto-electrical converter using transmission wavelength selection signal TX_WSS, and it controls electro-optical converter 500 using reception wavelength selection signal RX_WSS.

Wavelength control signal CS may be received from a host device, for example. The host device may be, e.g., a CPU, a memory controller, or a serial presence detect (SPD). Wavelength control signal CS is typically transmitted through an electrical channel such as an electrical wire. Wavelength control signal CS may be transmitted through an optical channel such as an optical fiber. Reception wavelength selection signal RX_WSS may be generated based on wavelength control signal CS and a logic circuit in wavelength selector 100. Transmission wavelength selection signal TX_WSS is generated based on wavelength control signal CS and a logic circuit in wavelength selector 100.

Referring to FIGS. 1 and 2, a memory system 20 comprises the host device and slave devices. The host device may be memory controller 400 and the slave device may comprise at least one memory device 600. For example, memory controller 400 and memory device 600 may be equipped on a mother board MB as shown in FIG. 2. Memory device 600 may be implemented as a memory module. The memory module may be equipped on a socket in mother board MB. Memory controller 400 and memory device 600 may be connected through the optical channel. Memory controller 400 comprises an electro-optical device 410. Memory device 600 comprises optical transmission converter 10a.

As described below with reference to FIG. 3, opto-electrical converter 300 converts a selection optical signal S_OS to a reception electrical signal RX_ES. Selection optical signal S_OS corresponds to at least one reception selection wavelength based on a reception optical signal RX_OS from memory controller 400 and reception wavelength selection signal RX_WSS. Reception optical signal RX_OS from memory controller 400 may be transmitted through the optical channel. The optical signal comprises optical signals that are modulated with multiple light signals, the light signals having multiple wavelengths. The light signals may comprise laser light, for example. At least one wavelength among the wavelengths is selected according to reception wavelength selection signal RX_WSS. If the reception selection wavelength is selected based on reception wavelength selection signal RX_WSS, opto-electrical converter 300 converts selection optical signal S_OS to reception electrical signal RX_ES by selecting selection optical signal S_OS corresponding to the reception selection wavelength of reception optical signal RX_OS.

Electro-optical converter 500 converts a transmission electrical signal TX_ES to a transmission optical signal TX_OS. Transmission optical signal TX_OS corresponds to at least one transmission selection wavelength based on transmission wavelength selection signal TX_WSS and transmission electrical signal TX_ES. At least one wavelength among wavelengths is selected according to transmission wavelength selection signal TX_WSS. Where the transmission selection wavelength is selected based on transmission wavelength selection signal TX_WSS, electro-optical converter 500 converts transmission electrical signal TX_ES to transmission optical signal TX_OS corresponding to the transmission selection wavelength. Transmission optical signal TX_OS is transmitted to memory controller 400 through the optical channel.

Optical transmission converter 10a selectively receives selection optical signal S_OS, the selection optical signal being used in each memory device 600, of reception optical signal RX_OS that is transmitted using the wavelengths. Therefore, data required in each memory device 600 may be modulated using each different wavelength. Where the modulated data using each different wavelength is transmitted from memory controller 400 through the optical channel, each memory device 600 selectively receives the required data based on wavelength control signal CS. Because the modulated data using each different wavelength is transmitted through the optical channel, data transmission speed between memory controller 400 and memory device 600 may be increased.

Where the wavelength used in each memory device 600 is different, optical transmission converter 10a may be required for each wavelength. However, if optical transmission converter 10a is used, optical transmission converter 10a for each wavelength may not be required because the wavelength is selected based on reception wavelength selection signal RX_WSS and transmission wavelength selection signal TX_WSS. Therefore optical transmission converter 10a may be efficiently implemented.

Figure 3:
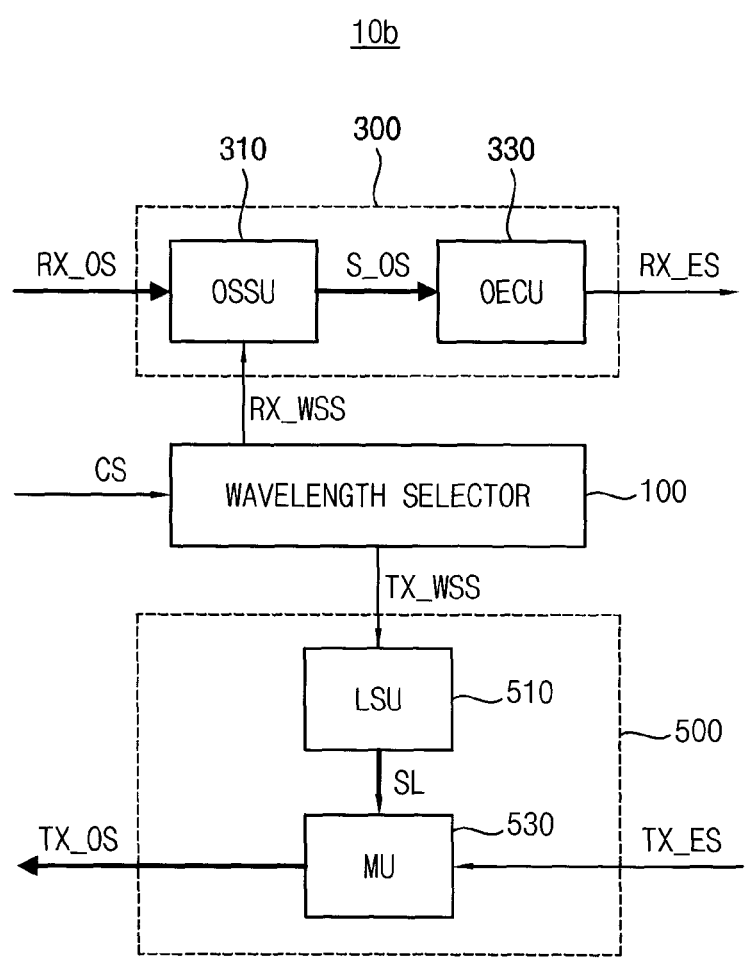
FIG. 3 is a block diagram illustrating an optical transmission converter according to an embodiment of the inventive concept.

FIG. 3 is a block diagram illustrating the optical transmission converter according to an embodiment of the inventive concept.

Referring to FIG. 3, an optical transmission converter 10b comprises a wavelength selector 100, an opto-electrical converter 300 and an electro-optical converter 500. Opto-electrical converter 300 comprises an optical signal selection unit 310 and an opto-electrical converting unit 330. Electro-optical converter 500 comprises a light signal selection unit 510 and a modulation unit 530.

Optical signal selection unit 310 outputs selection optical signal S_OS corresponding to the at least one reception selection wavelength of reception optical signal RX_OS based on reception wavelength selection signal RX_WSS. Reception optical signal RX_OS may include the modulated signals using the wavelengths. The modulated signals may be laser.

At least one wavelength of the wavelengths is selected according to reception wavelength selection signal RX_WSS. Where the reception selection wavelength is selected based on reception wavelength selection signal RX_WSS, optical signal selection unit 310 may select selection optical signal S_OS corresponding to the reception selection wavelength of reception optical signal RX_OS.

Opto-electrical converting unit 330 converts selection optical signal S_OS to reception electrical signal RX_ES corresponding to selection optical signal S_OS.

Light signal selection unit 510 provides a selection light signal SL corresponding to the at least one transmission selection wavelength based on transmission wavelength selection signal TX_WSS. At least one wavelength among the wavelengths is selected according to transmission wavelength selection signal TX_WSS.

Modulation unit 530 outputs transmission optical signal TX_OS by modulating transmission electrical signal TX_ES using selection light signal SL.

Where the transmission selection wavelength is selected based on transmission wavelength selection signal TX_WSS, electro-optical converter 500 converts transmission electrical signal TX_ES to transmission optical signal TX_OS corresponding to the transmission selection wavelength. Transmission optical signal TX_OS is transmitted to memory controller 400 through the optical channel.

Figure 4:
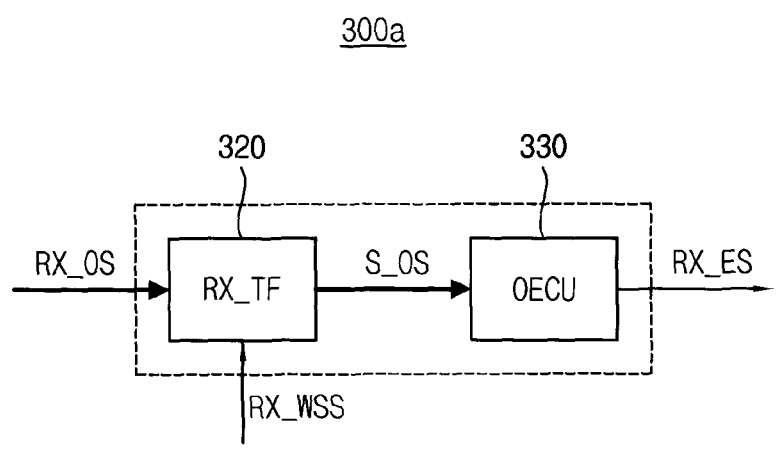
FIG. 4 is a block diagram illustrating an example of an opto-electrical converter in the optical transmission converter of FIG. 1, according to an embodiment of the inventive concept.

FIG. 4 is a block diagram illustrating an example of an opto-electrical converter in the optical transmission converter of FIG. 1, according to an embodiment of the inventive concept.

Referring to FIG. 4, opto-electrical converter 300a comprises a reception tunable filter 320 and an opto-electrical converting unit 330. Optical signal selection unit 310 comprises a reception tunable filter 320. Reception tunable filter 320 controls a reception filtering wavelength to match the reception selection wavelength, and output selection optical signal S_OS by filtering reception optical signal RX_OS. Optical signal selection unit 310 may be implemented using reception tunable filter 320. Reception tunable filter 320 controls a wavelength of reception tunable filter 320 to match the reception selection wavelength of the wavelengths in reception optical signal RX_OS. Selection optical signal S_OS from reception tunable filter 320 is converted to reception electrical signal RX_ES corresponding to the reception selection wavelength.

Figure 5:
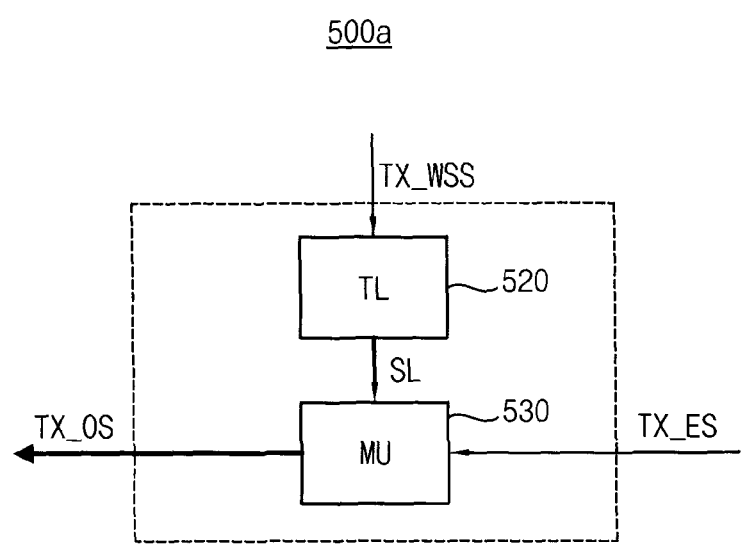
FIG. 5 is a block diagram illustrating an example of an electro-optical converter in the optical transmission converter of FIG. 1, according to an embodiment of the inventive concept.

FIG. 5 is a block diagram illustrating an example of an electro-optical converter in the optical transmission converter of FIG. 1, according to an embodiment of the inventive concept.

Referring to FIG. 5, electro-optical converter 500a comprises a tunable light signal generator 520 and a modulation unit 530. Light signal selection unit 510 comprises a tunable light signal generator 520. Tunable light signal generator 520 provides selection light signal SL by controlling a wavelength of a light signal to match the transmission selection wavelength. Light signal selection unit 510 may be implemented using tunable light signal generator 520. Tunable light signal generator 520 controls a wavelength of tunable light signal generator 520 to match the wavelength of selection light signal SL of the light signals including the wavelengths. The light signals including the wavelengths may be the laser. Selection light signal SL from tunable light signal generator 520 is used to convert transmission electrical signal TX_ES to transmission optical signal TX_OS.

The optical transmission converter selectively receives selection optical signal S_OS that is required in each memory device 600 of reception optical signal RX_OS that is transmitted using the wavelengths. Therefore, data required in each memory device 600 may be modulated using each different wavelength. Even though the modulated data using each different wavelength is transmitted from memory controller 400 through the optical channel, each memory device 600 may selectively receive the required data based on wavelength control signal CS. Because the modulated data using each different wavelength is transmitted through the optical channel, data transmission speed between memory controller 400 and memory device 600 may be increased.

Where the wavelength used in each memory device 600 is different, an optical transmission converter for each wavelength may be required. However, if the above-described optical transmission converter is used, the optical transmission converter for each wavelength may not be required because the wavelength is selected based on reception wavelength selection signal RX_WSS and transmission wavelength selection signal TX_WSS. Therefore an optical transmission converter may be implemented more efficiently.

Figure 6:
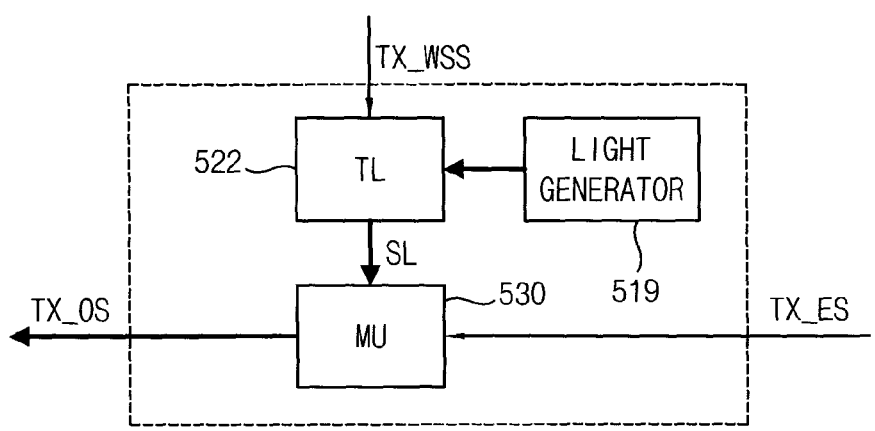
FIG. 6 is a block diagram illustrating another example of the electro-optical converter in the optical transmission converter of FIG. 1, according to an embodiment of the inventive concept.

FIG. 6 is a block diagram illustrating another example of the electro-optical converter in the optical transmission converter of FIG. 1, according to an embodiment of the inventive concept.

Referring to FIG. 6, electro-optical converter 500b comprises a transmission tunable filter 522, a light generator 519 and a modulation unit 530. Light signal selection unit 510 comprises a light generator 519 and a transmission tunable filter 522. Light generator 519 provides multiple light signals. The light signals may be laser signals, for example. Additionally, the light signals may have multiple wavelengths.

Transmission tunable filter 522 controls a transmission filtering wavelength to match the transmission selection wavelength, and it outputs selection light signal SL by filtering the light signals selectively. Light signal selection unit 510 may be implemented using light generator 519 and transmission tunable filter 522. Transmission tunable filter 522 controls the wavelength of transmission tunable filter 522 to match the transmission selection wavelength of the light signals including the wavelengths. Selection light signal SL from transmission tunable filter 522 is used to convert transmission electrical signal TX_ES to transmission optical signal TX_OS. The wavelengths, selection light signal SL, and transmission optical signal TX_OS corresponding to outputs of light generator 519, transmission tunable filter 522 and modulation unit 530 are transferred through the optical channel.

Figure 7:
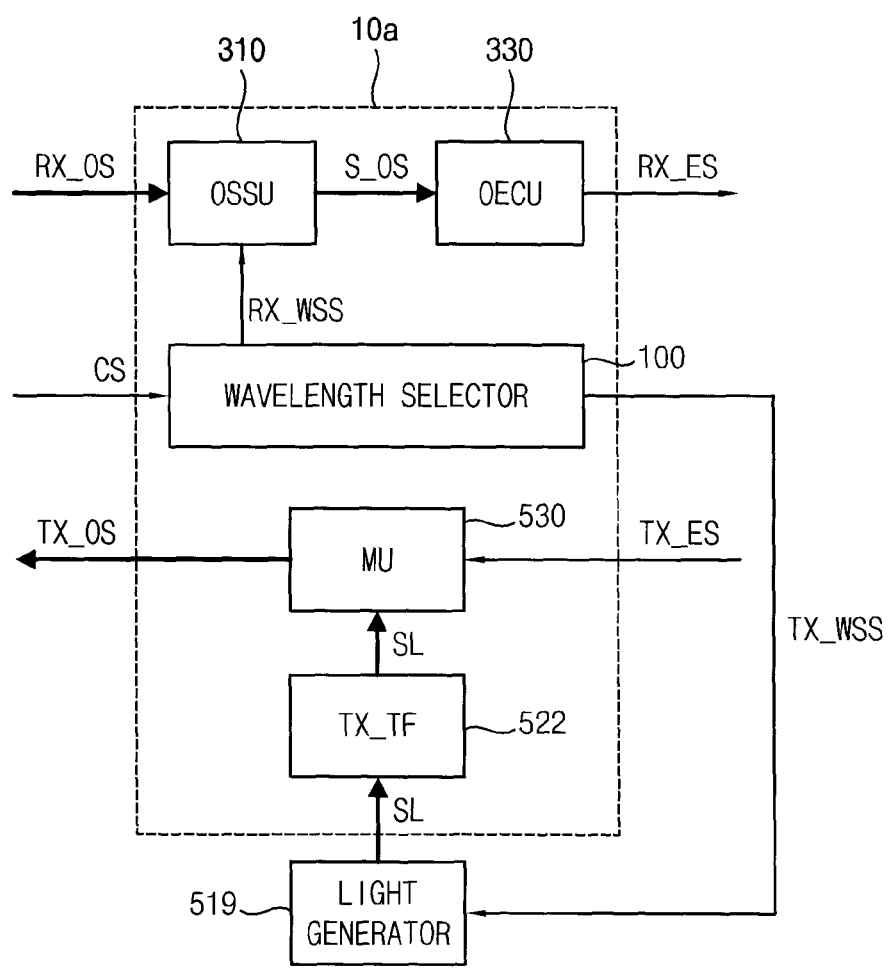
FIG. 7 is a block diagram illustrating an optical transmission converter according to an embodiment of the inventive concept.

FIG. 7 is a block diagram illustrating the optical transmission converter according to an embodiment of the inventive concept.

Referring to FIG. 7, light generator 519 is implemented outside of optical transmission converter 10a, and it provides the light signals for transmission tunable filter 522. Light generator 519 provides the light signals having the wavelengths. The light signals are laser signals. The number of memory devices 600 including optical transmission converter 10a may be more than two.

Where light generator 519 is implemented outside of optical transmission converter 10a, light generator 519 may not be required for each memory device 600. Where each optical transmission converter 10a receives the light signals including the wavelengths outside of optical transmission converter 10a, a hardware complexity may be decreased efficiently.

Figure 8:
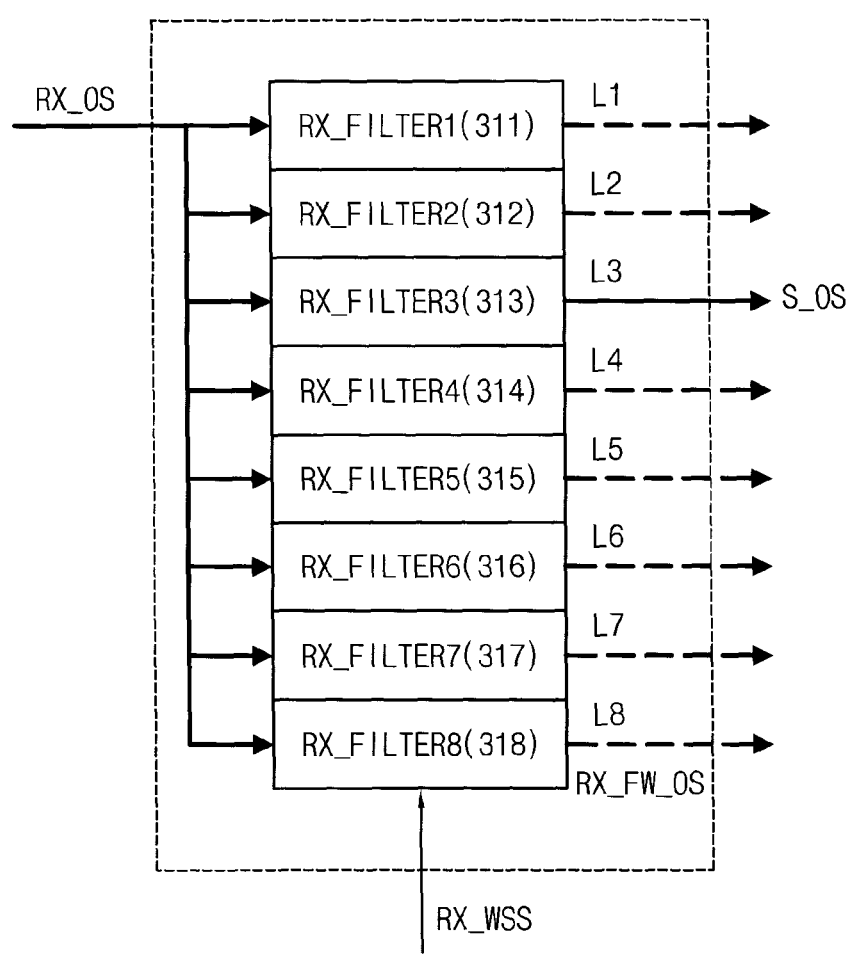
FIG. 8 is a block diagram illustrating an example of an optical signal selection unit in the opto-electrical converter of FIG. 1, according to an embodiment of the inventive concept.

FIG. 8 is a block diagram illustrating an example of an optical signal selection unit in the opto-electrical converter of FIG. 1, according to an embodiment of the inventive concept.

Referring to FIG. 8, optical signal selection unit 310 comprises multiple reception fixed-wavelength filters 311 to 318. Reception fixed-wavelength filters 311 to 318 output fixed-wavelength optical signals RX_FW_OS corresponding to fixed-wavelengths by filtering reception optical signal RX_OS. Reception optical signal RX_OS is transferred through the optical channel. Optical signal selection unit 310 may be implemented using reception fixed-wavelength filters 311 to 318.

For example, reception fixed-wavelength filter_1_311 outputs a fixed-wavelength optical signal RX_FW_OS corresponding to lambda 1 wavelength of reception optical signal RX_OS. Reception fixed-wavelength filter_2_312 outputs a fixed-wavelength optical signal RX_FW_OS corresponding to lambda 2 wavelength of reception optical signal RX_OS. Reception fixed-wavelength filter_3_313 outputs a fixed-wavelength optical signal RX_FW_OS corresponding to lambda 3 wavelength of reception optical signal RX_OS. Reception fixed-wavelength filter_4_314 outputs a fixed-wavelength optical signal RX_FW_OS corresponding to lambda 4 wavelength of reception optical signal RX_OS. Reception fixed-wavelength filter_5_315 outputs a fixed-wavelength optical signal RX_FW_OS corresponding to lambda 5 wavelength of reception optical signal RX_OS. Reception fixed-wavelength filter_6_316 outputs a fixed-wavelength optical signal RX_FW_OS corresponding to lambda 6 wavelength of reception optical signal RX_OS. Reception fixed-wavelength filter_7_317 outputs a fixed-wavelength optical signal RX_FW_OS corresponding to lambda 7 wavelength of reception optical signal RX_OS. Reception fixed-wavelength filter_8_318 outputs a fixed-wavelength optical signal RX_FW_OS corresponding to lambda 8 wavelength of reception optical signal RX_OS.

Selection optical signal S_OS is generated by activating or deactivating reception fixed-wavelength filters 311 to 318 according to reception wavelength selection signal RX_WSS. For example, to output fixed-wavelength optical signal RX_FW_OS corresponding to lambda 1 wavelength as selection optical signal S_OS, reception fixed-wavelength filter_1_311 may be activated and the reception fixed-wavelength filters 312 to 318 except the reception fixed-wavelength filter_1_311 may be deactivated. To output the fixed-wavelength optical signal RX_FW_OS corresponding to lambda 3 wavelength as selection optical signal S_OS, reception fixed-wavelength filter_3_313 may be activated and reception fixed-wavelength filters 311, 312 and 314 to 318 except the reception fixed-wavelength filter_3_313 may be deactivated.

Figure 9:
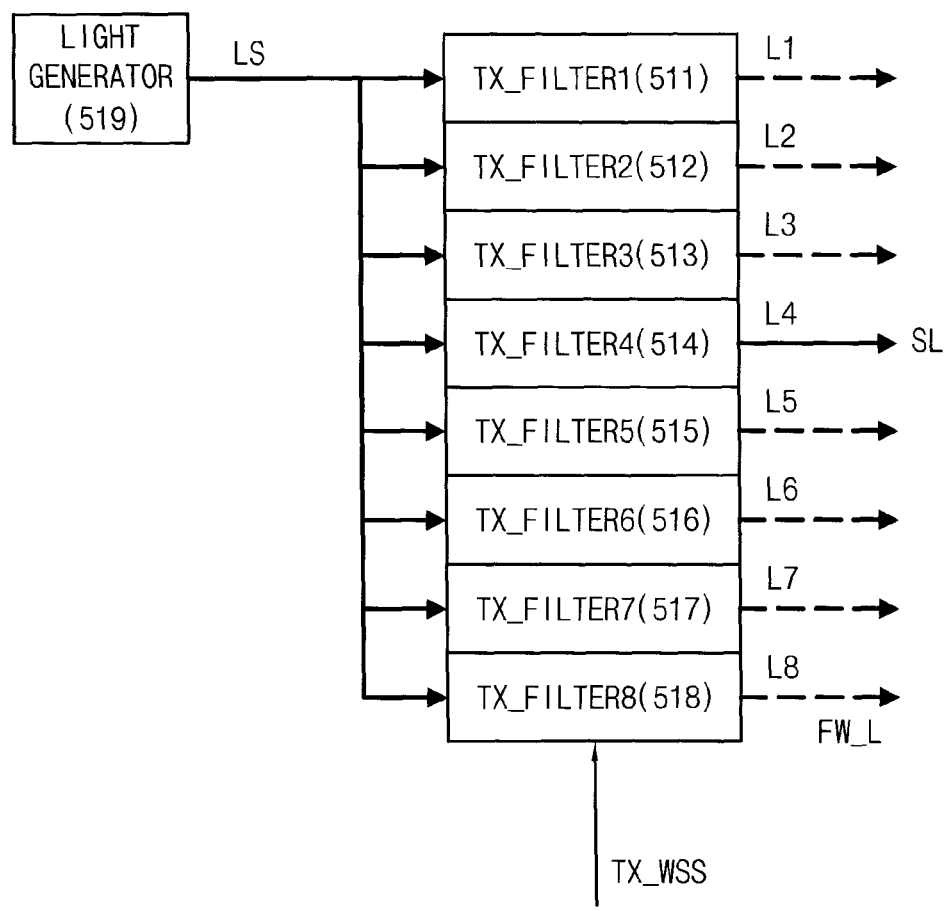
FIG. 9 is a block diagram illustrating an example of a light signal selection unit in the electro-optical converter of FIG. 1, according to an embodiment of the inventive concept.

FIG. 9 is a block diagram illustrating an example of a light signal selection unit in the electro-optical converter of FIG. 1, according to an embodiment of the inventive concept.

Referring to FIG. 9, light signal selection unit 510 comprises multiple transmission fixed-wavelength filters 511 to 518. Transmission fixed-wavelength filters 511 to 518 outputs fixed-wavelength light signals FW_L corresponding to fixed-wavelengths by filtering light signals. Light generator 519 generates the light signals having the wavelengths. The light signals may be laser signals, for instance. The light signals may be transferred through the optical channel. Light signal selection unit 510 may be implemented using transmission fixed-wavelength filters 511 to 518.

For example, transmission fixed-wavelength filter_1_511 outputs a fixed-wavelength light signal FW_L corresponding to lambda 1 wavelength of the light signals. Transmission fixed-wavelength filter_2_512 outputs a fixed-wavelength light signal FW_L corresponding to lambda 2 wavelength of the light signals. Transmission fixed-wavelength filter_3_513 outputs a fixed-wavelength light signal FW_L corresponding to lambda 3 wavelength of the light signals. Transmission fixed-wavelength filter_4_514 outputs a fixed-wavelength light signal FW_L corresponding to lambda 4 wavelength of the light signals. Transmission fixed-wavelength filter_5_515 outputs a fixed-wavelength light signal FW_L corresponding to lambda 5 wavelength of the light signals. Transmission fixed-wavelength filter_6_516 outputs a fixed-wavelength light signal FW_L corresponding to lambda 6 wavelength of the light signals. Transmission fixed-wavelength filter_7_517 outputs a fixed-wavelength light signal FW_L corresponding to lambda 7 wavelength of the light signals. Transmission fixed-wavelength filter_8_518 outputs a fixed-wavelength light signal FW_L corresponding to lambda 8 wavelength of the light signals.

Selection light signal SL is generated by activating or deactivating transmission fixed-wavelength filters 511 to 518 according to transmission wavelength selection signal TX_WSS. For example, to output fixed-wavelength light signal FW_L corresponding to lambda 1 wavelength as selection light signal SL, transmission fixed-wavelength filter_1_511 may be activated and transmission fixed-wavelength filters 512 to 518 except transmission fixed-wavelength filter_1_511 may be deactivated. To output fixed-wavelength light signal FW_L corresponding to lambda 4 wavelength as selection light signal SL, transmission fixed-wavelength filter_4_514 may be activated and transmission fixed-wavelength filters 511 to 513 and 515 to 518 except the transmission fixed-wavelength filter_4_514 may be deactivated.

Figure 10:
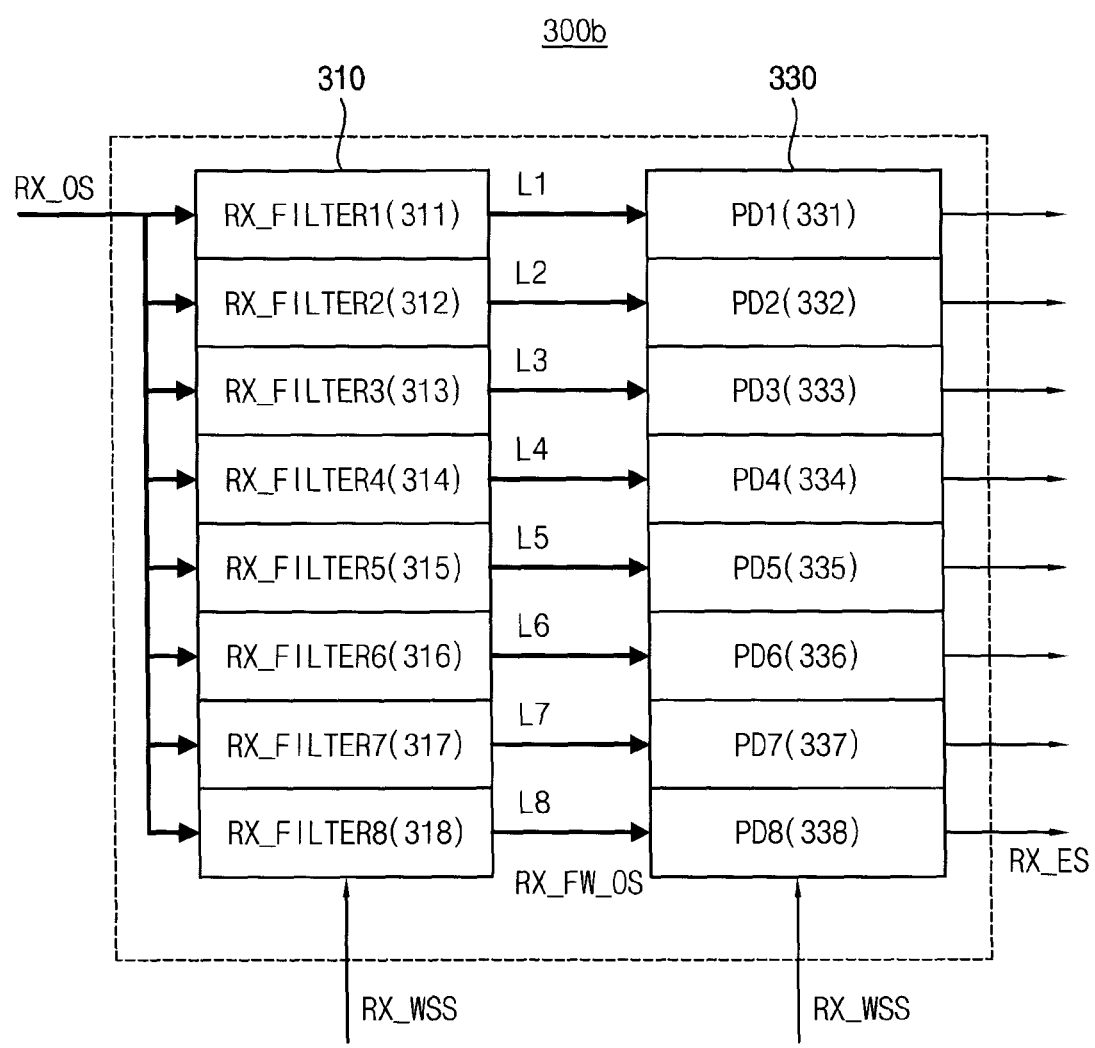
FIG. 10 is a block diagram illustrating another example of the opto-electrical converter in the optical transmission converter of FIG. 1, according to an embodiment of the inventive concept.

FIG. 10 is a block diagram illustrating another example of the opto-electrical converter in the optical transmission converter of FIG. 1, according to an embodiment of the inventive concept.

Referring to FIG. 10, opto-electrical converter 300b comprises optical signal selection unit 310 and opto-electrical converting unit 330. Optical signal selection unit 310 comprises multiple reception fixed-wavelength filters 311 to 318. Reception fixed-wavelength filters 311 to 318 may output fixed-wavelength optical signals RX_FW_OS corresponding to fixed-wavelengths by filtering reception optical signal RX_OS. The at least one selection optical signal S_OS is generated by activating or deactivating reception fixed-wavelength filters 311 to 318 according to reception wavelength selection signal RX_WSS.

Opto-electrical converting unit 330 concurrently output the at least one reception electrical signal RX_ES by converting the at least one selection optical signal S_OS. For example, to concurrently output fixed-wavelength light signals FW_L corresponding to lambda 1 and lambda 2 wavelength as selection light signals SL, the transmission fixed-wavelength filter_1_511 and the transmission fixed-wavelength filter_2_512 may be activated and the transmission fixed-wavelength filters 513 to 518 except the transmission fixed-wavelength filter_1_511 and the transmission fixed-wavelength filter_2_512 may be deactivated. To concurrently output fixed-wavelength light signals FW_L corresponding to lambda 1, lambda 2 and lambda 4 wavelength as selection light signals SL, the transmission fixed-wavelength filter_1_511, transmission fixed-wavelength filter_2_512 and the transmission fixed-wavelength filter_4_514 may be activated, and the transmission fixed-wavelength filters 513 and 515 to 518 except the transmission fixed-wavelength filter_1_511, the transmission fixed-wavelength filter_2_512 and the transmission fixed-wavelength filter_4_514 may be deactivated.

For example, to concurrently convert selection light signals SL corresponding to lambda 1 and lambda 2 wavelength to reception electrical signals RX_ES, a photodetector_1_331 and a photodetector_2_332 may be activated and photodetectors 333 to 338 except photodetector_1_331 and photodetector_2_332 may be deactivated. To concurrently convert selection light signals SL corresponding to lambda 1, lambda 2 and lambda 3 wavelength to reception electrical signals RX_ES, photodetector_1_331, photodetector_2_332 and a photodetector_3_333 may be activated and photodetectors 334 to 338 except photodetector_1_331, photodetector_2_332 and photodetector_3_333 may be deactivated.

The optical transmission converter may selectively receive selection optical signal S_OS that is required in each memory device 600 of reception optical signal RX_OS that is transmitted using the wavelengths. Therefore, data required in each memory device 600 may be modulated using each different wavelength. Even though the modulated data using each different wavelength is transmitted from memory controller 400 through the optical channel, each memory device 600 may selectively receive the required data based on wavelength control signal CS. Because the modulated data using each different wavelength is transmitted through the optical channel, data transmission speed between memory controller 400 and memory device 600 may be increased.

Where the wavelength used in each memory device 600 is different, the optical transmission converter for each wavelength may be required. However, if the optical transmission converter according to an embodiment of the inventive concept is used, the optical transmission converter for each wavelength may not be required because the wavelength is selected based on reception wavelength selection signal RX_WSS and transmission wavelength selection signal TX_WSS. Therefore the optical transmission converter may be efficiently implemented.

Figure 11:
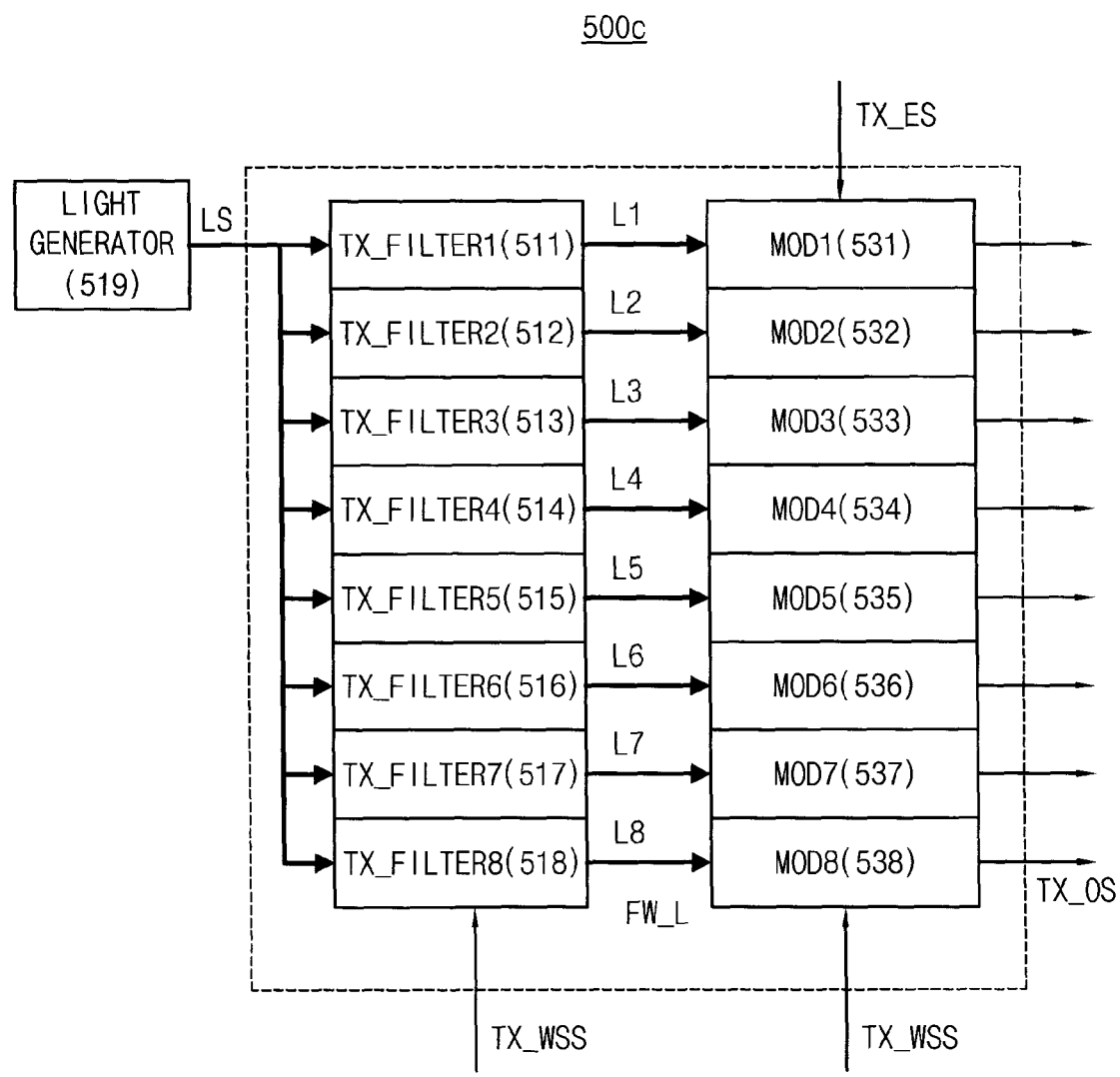
FIG. 11 is a block diagram illustrating another example of the electro-optical converter in the optical transmission converter of FIG. 1, according to an embodiment of the inventive concept.

FIG. 11 is a block diagram illustrating another example of the electro-optical converter in the optical transmission converter of FIG. 1, according to an embodiment of the inventive concept.

Referring to FIG. 11, electro-optical converter 500c comprises multiple transmission fixed-wavelength filters 511 to 518 and multiple modulators 531 to 538. Light signal selection unit 510 comprises multiple transmission fixed-wavelength filters 511 to 518. Transmission fixed-wavelength filters 511 to 518 output fixed-wavelength light signals FW_L corresponding to fixed-wavelengths by filtering light signals. The at least one selection light signal SL may be provided by activating or deactivating transmission fixed-wavelength filters 511 to 518 according to transmission wavelength selection signal TX_WSS.

Modulation unit 530 may concurrently output the at least one transmission optical signal TX_OS by modulating transmission electrical signal TX_ES using the at least light signal. For example, to concurrently output fixed-wavelength light signals FW_L corresponding to lambda 1 and lambda 2 wavelength as selection light signals SL, transmission fixed-wavelength filter_1_511 and the transmission fixed-wavelength filter_2_512 may be activated and the transmission fixed-wavelength filters 513 to 518 except transmission fixed-wavelength filter_1_511 and transmission fixed-wavelength filter_2_512 may be deactivated. To concurrently output fixed-wavelength light signals FW_L corresponding to lambda 1, lambda 2 and lambda 4 wavelength as selection light signals SL, transmission fixed-wavelength filter_1_511, transmission fixed-wavelength filter_2_512 and transmission fixed-wavelength filter_4_514 may be activated, and transmission fixed-wavelength filters 513 and 515 to 518 except transmission fixed-wavelength filter_1_511, transmission fixed-wavelength filter_2_512 and transmission fixed-wavelength filter_4_514 may be deactivated.

For example, to concurrently output transmission optical signals TX_OS by modulating transmission electrical signal TX_ES using selection light signals SL corresponding to lambda 1 and lambda 2 wavelength, a modulator_1_531 and a modulator_2_532 may be activated and modulators 533 to 538 except modulator_1_531 and modulator_2_532 may be deactivated. To concurrently output transmission optical signals TX_OS by modulating transmission electrical signal TX_ES using selection light signals SL corresponding to lambda 1, lambda 2 and lambda 3 wavelength, modulator_1_531, modulator_2_532 and a modulator_3_533 may be activated and modulators 534 to 538 except modulator_1_531, modulator_2_532 and modulator_3_533 may be deactivated.

Figure 12:
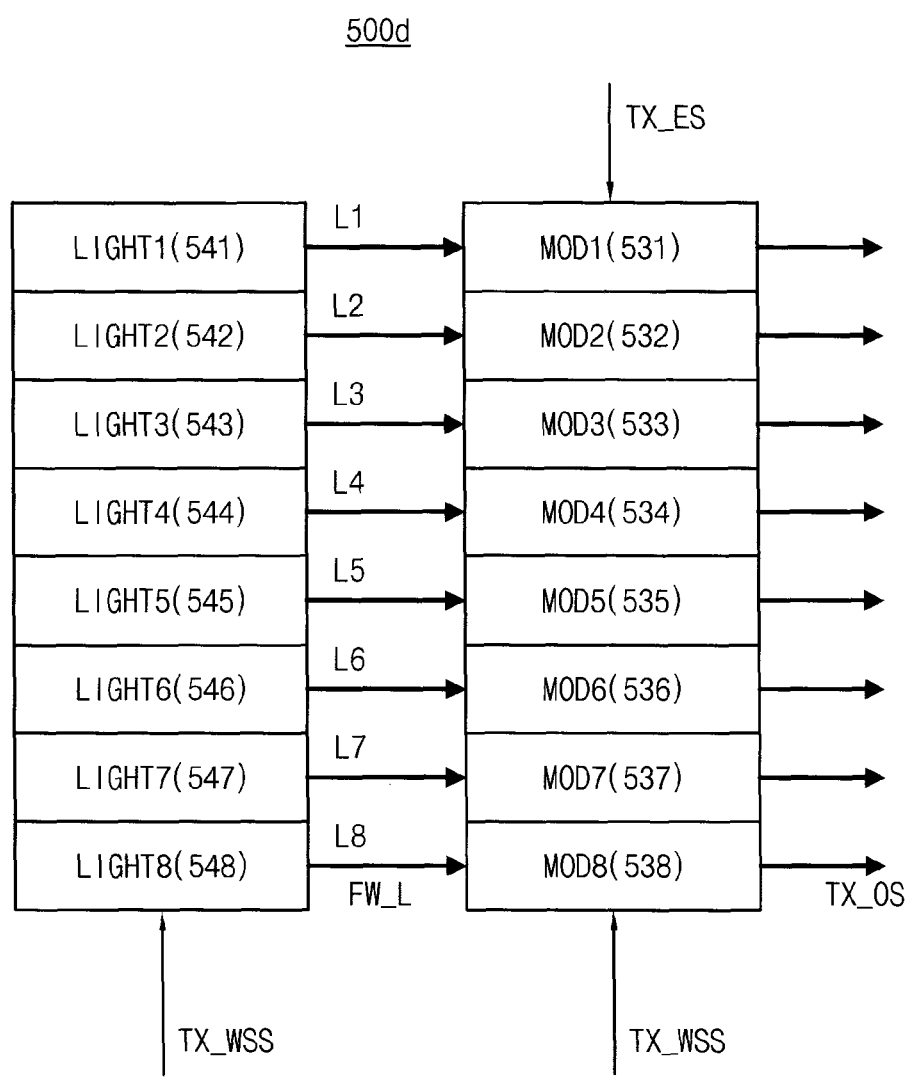
FIG. 12 is a block diagram illustrating still another example of the electro-optical converter in the optical transmission converter of FIG. 1, according to an embodiment of the inventive concept.

FIG. 12 is a block diagram illustrating still another example of the electro-optical converter in the optical transmission converter of FIG. 1, according to an embodiment of the inventive concept.

Referring to FIG. 12, electro-optical converter 500d comprises at least one fixed-wavelength light generator 541 to

548. Light signal selection unit 510 comprises at least one fixed-wavelength light generator 541 to 548.

Fixed-wavelength light signal FW_L may be the laser. For example, a fixed-wavelength light generator_1_541 may generate a lambda 1 wavelength light signal. A fixed-wavelength light generator_2_542 may generate a lambda 2 wavelength light signal. A fixed-wavelength light generator_3_543 may generate a lambda 3 wavelength light signal. A fixed-wavelength light generator_4_544 may generate a lambda 4 wavelength light signal. A fixed-wavelength light generator_5_545 may generate a lambda 5 wavelength light signal. A fixed-wavelength light generator_6_546 may generate a lambda 6 wavelength light signal. A fixed-wavelength light generator_7_547 may generate a lambda 7 wavelength light signal. A fixed-wavelength light generator_8_548 may generate a lambda 8 wavelength light signal.

The at least one selection light signal SL may be provided by activating or deactivating the transmission fixed-wavelength light generator 541 to 548 according to transmission wavelength selection signal TX_WSS. For example, to concurrently output fixed-wavelength light signals FW_L corresponding to lambda 1 and lambda 2 wavelength as selection light signals SL, transmission fixed-wavelength light generator_1_541 and transmission fixed-wavelength light generator_2_542 may be activated and transmission fixed-wavelength light generators 543 to 548 except transmission fixed-wavelength light generator_1_541 and transmission fixed-wavelength light generator_2_542 may be deactivated. To concurrently output fixed-wavelength light signals FW_L corresponding to lambda 1, lambda 2 and lambda 3 wavelength as selection light signals SL, transmission fixed-wavelength light generator_1_541, transmission fixed-wavelength light generator_2_542 and transmission fixed-wavelength light generator_3_543 may be activated and the transmission fixed-wavelength light generators 544 to 548 except transmission fixed-wavelength light generator_1_541, transmission fixed-wavelength light generator_2_542 and transmission fixed-wavelength light generator_3_543 may be deactivated.

Modulation unit 530 concurrently outputs the at least one transmission optical signal TX_OS by modulating transmission electrical signal TX_ES using the at least fixed-wavelength light signal FW_L. Each of fixed-wavelength light signals FW_L may be selection light signal SL. Transmission optical signal TX_OS may be provided by activating or deactivating modulators 531 to 538 according to transmission wavelength selection signal TX_WSS. For example, a modulator_1_531 and a modulator_2_532 may concurrently output transmission optical signals TX_OS by modulating transmission electrical signal TX_ES using selection light signals SL corresponding to lambda 1 and lambda 2 wavelength. Modulator_1_531, modulator_2_532 and a modulator_3_533 may concurrently output transmission optical signals TX_OS by modulating transmission electrical signal TX_ES using selection light signals SL corresponding to lambda 1, lambda 2 and lambda 3 wavelength.

Figure 13:
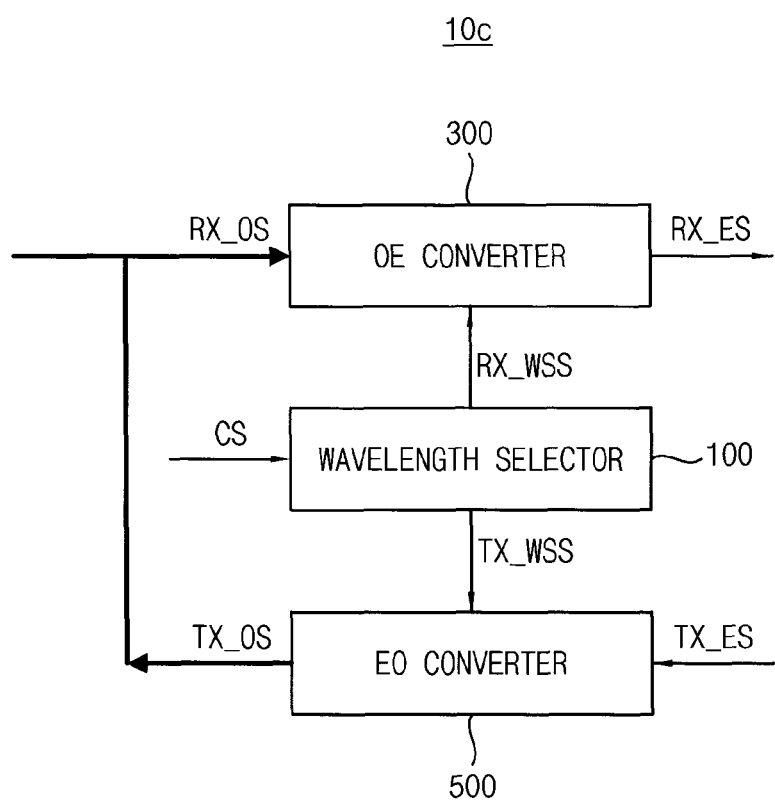
FIG. 13 is a block diagram illustrating the optical transmission converter according to an embodiment of the inventive concept.

FIG. 13 is a block diagram illustrating the optical transmission converter according to an embodiment of the inventive concept.

Referring to FIG. 13, optical transmission converter 10*c* comprises a wavelength selector 100, an opto-electrical converter 300 and an electro-optical converter 500. Wavelength selector 100 provides a reception wavelength selection signal RX_WSS and a transmission wavelength selection signal TX_WSS in response to a wavelength control signal CS. Opto-electrical converter 300 converts a selection optical signal S_OS to a reception electrical signal RX_ES. Selection optical signal S_OS corresponds to at least one reception selection wavelength based on a reception optical signal RX_OS from memory controller 400 and reception wavelength selection signal RX_WSS. Electro-optical converter 500 converts a transmission electrical signal TX_ES to a transmission optical signal TX_OS. Transmission optical signal TX_OS corresponds to at least one transmission selection wavelength based on transmission wavelength selection signal TX_WSS and transmission electrical signal TX_ES. Reception optical signal RX_OS and transmission optical signal TX_OS may be transmitted through a bi-directional channel.

Figure 14:
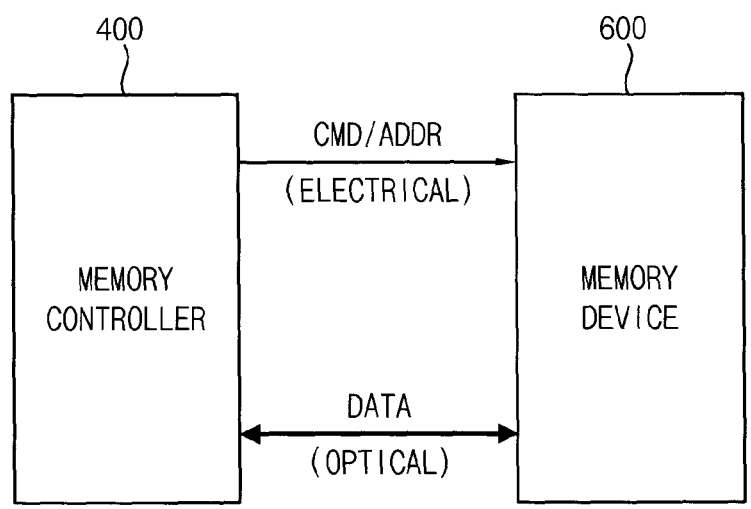
FIG. 14 is a diagram illustrating an example of a transmission channel between a memory controller and a memory device, according to an embodiment of the inventive concept.
Figure 15:
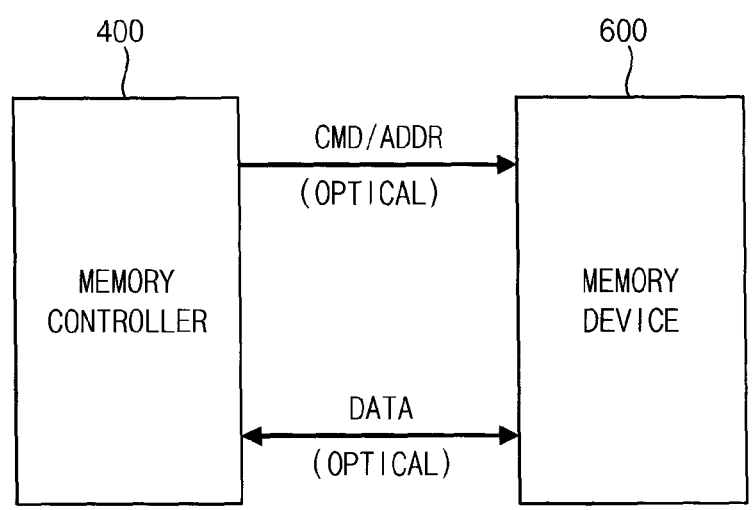
FIG. 15 is a diagram illustrating another example of the transmission channel between the memory controller and the memory device, according to an embodiment of the inventive concept.
Figure 16:
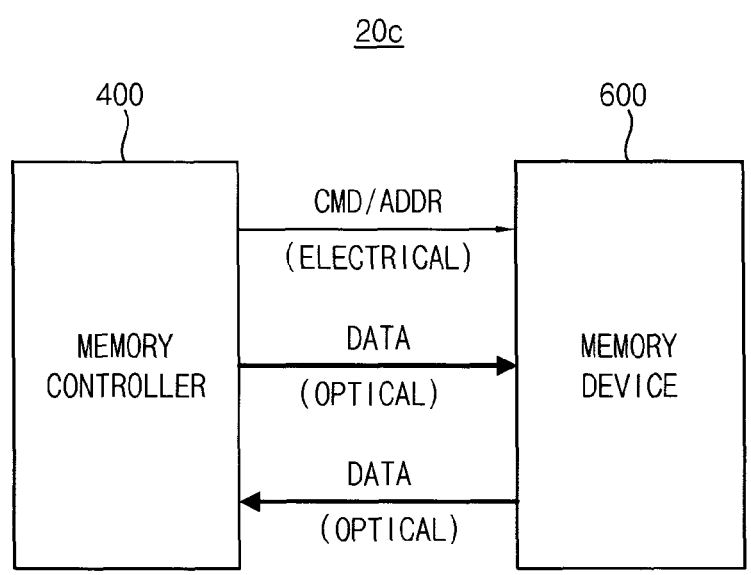
FIG. 16 is a diagram illustrating still another example of the transmission channel between the memory controller and the memory device, according to an embodiment of the inventive concept.

FIG. 14 is a diagram illustrating an example of a transmission channel between a memory controller and a memory device, according to an embodiment of the inventive concept, FIG. 15 is a diagram illustrating another example of the transmission channel between the memory controller and the memory device, according to an embodiment of the inventive concept, and FIG. 16 is a diagram illustrating still another example of the transmission channel between the memory controller and the memory device.

Referring to FIG. 14, a memory system 20*a* comprises memory controller 400 and memory device 600. Memory controller 400 transfers an address ADDR, a command CMD and data DATA to memory device 600. Memory device 600 transfers data DATA based on address ADDR and command CMD from memory controller 400.

Address ADDR and command CMD from memory controller 400 may be transferred to memory device 600 through an electrical channel such as the electrical wire, for example. Data DATA may be transferred between memory controller 400 and memory device 600 through an optical channel such as optical fiber, for example. Data DATA may be transferred between memory controller 400 and memory device 600 through a bi-directional optical channel.

Referring to FIGS. 15 and 16, memory system 20*b* and 20*c* comprises memory controller 400 and memory device 600. For example, address ADDR and command CMD from memory controller 400 may be transferred to memory device 600 through the optical channel such as the optical fiber. Data DATA may be transferred between memory controller 400 and memory device 600 through the optical channel. Data DATA may be transferred between memory controller 400 and memory device 600 through the bi-directional optical channel.

For example, address ADDR and command CMD from memory controller 400 may be transferred to memory device 600 through the electrical channel such as the electrical wire. Data DATA may be transferred between memory controller 400 and memory device 600 through the optical channel. Data DATA may be transferred between memory controller 400 and memory device 600 through uni-directional optical channel.

Figure 17:
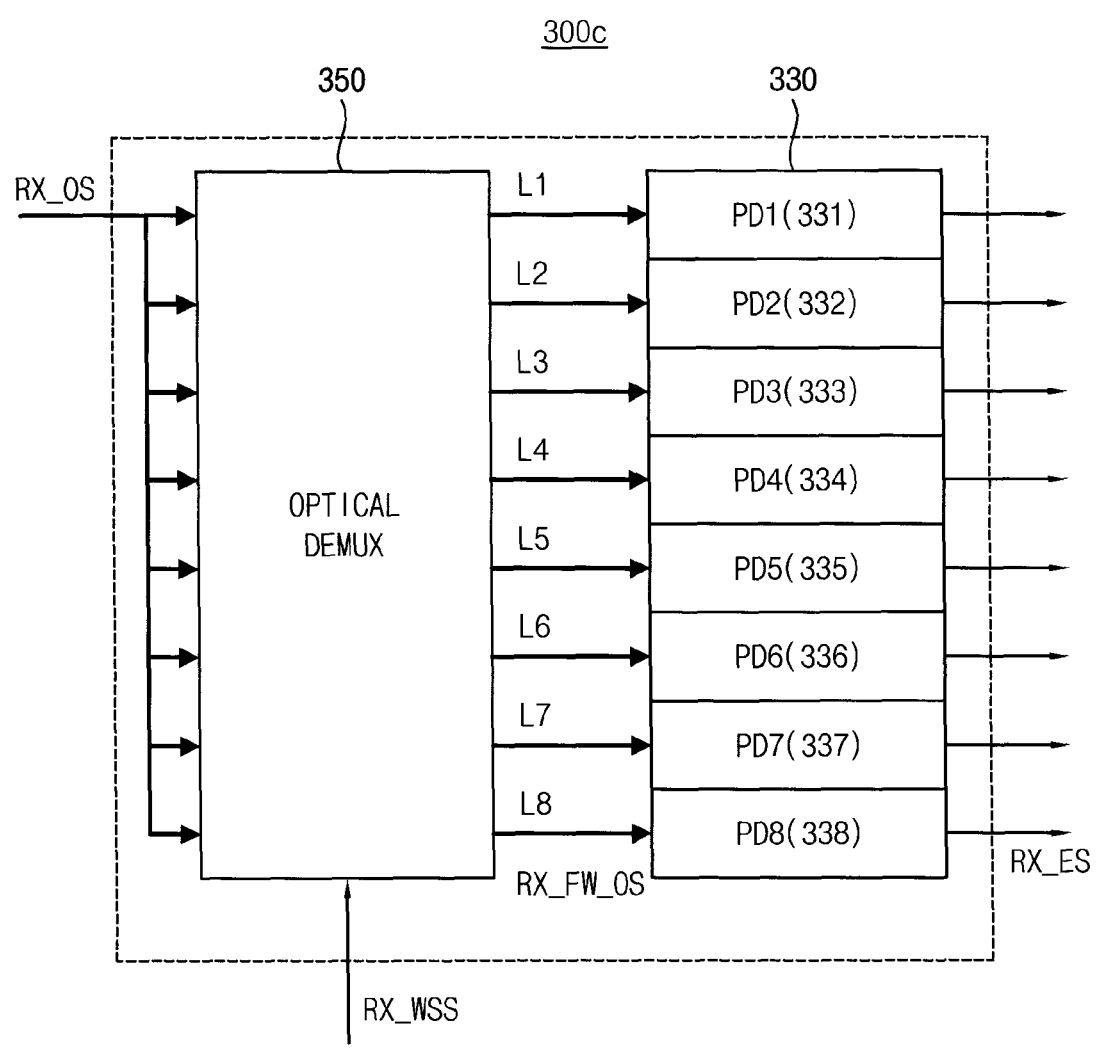
FIG. 17 is a block diagram illustrating still another example of the opto-electrical converter in the optical transmission converter of FIG. 1, according to an embodiment of the inventive concept.

FIG. 17 is a block diagram illustrating still another example of the opto-electrical converter in the optical transmission converter of FIG. 1, according to an embodiment of the inventive concept.

Referring to FIG. 17, opto-electrical converter 300*c* comprises optical signal selection unit 310 and opto-electrical converting unit 330. Optical signal selection unit 310 is implemented using optical demux 350. Selection optical signal S_OS corresponding to the reception selection wavelength of reception optical signal RX_OS may be outputted based on reception wavelength selection signal RX_WSS. The electro-optical converting unit may concurrently output reception electrical signal RX_ES by converting at least one selection optical signal S_OS.

Figure 18:
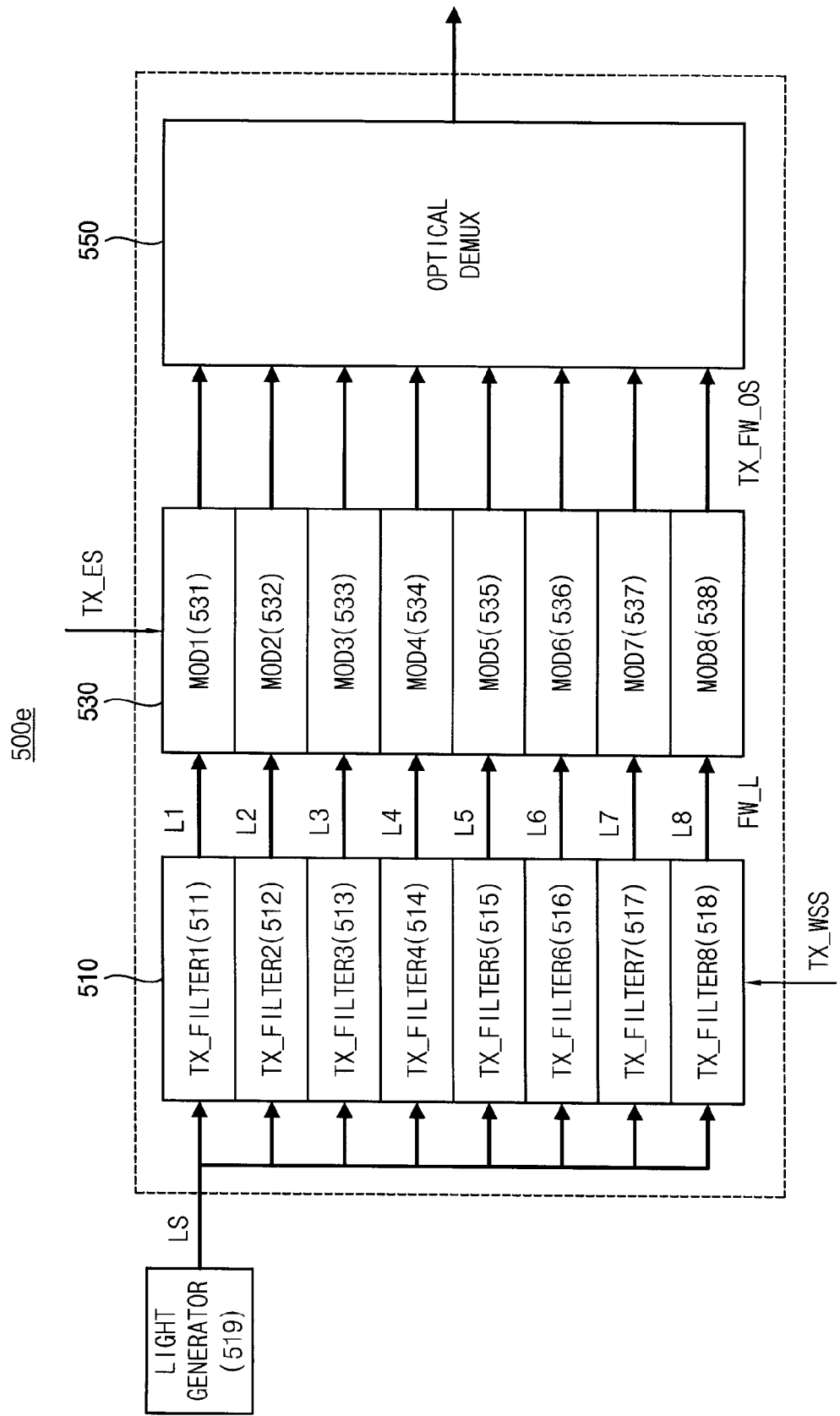
FIG. 18 is a block diagram illustrating still another example of the electro-optical converter in the optical transmission converter of FIG. 1, according to an embodiment of the inventive concept.

FIG. 18 is a block diagram illustrating still another example of the electro-optical converter in the optical transmission converter of FIG. 1, according to an embodiment of the inventive concept.

Referring to FIG. 18, an electro-optical converter 500e comprises a light generator, an optical signal selection unit 310, a modulation unit 530 and an optical mux 550. The light generator provides multiple light signals. Light signal selection unit 510 comprises multiple transmission fixed-wavelength filters 511 to 518. Transmission fixed-wavelength filters 511 to 518 may output fixed-wavelength light signals FW_L corresponding to fixed-wavelengths by filtering light signals. The at least one selection light signal SL is generated by activating or deactivating transmission fixed-wavelength filters 511 to 518 according to transmission wavelength selection signal TX_WSS. Modulation unit 530 concurrently outputs the at least one transmission optical signal TX_OS by modulating transmission electrical signal TX_ES using a selection light signal SL. Optical mux 550 selectively outputs transmission optical signal TX_OS.

Figure 19:
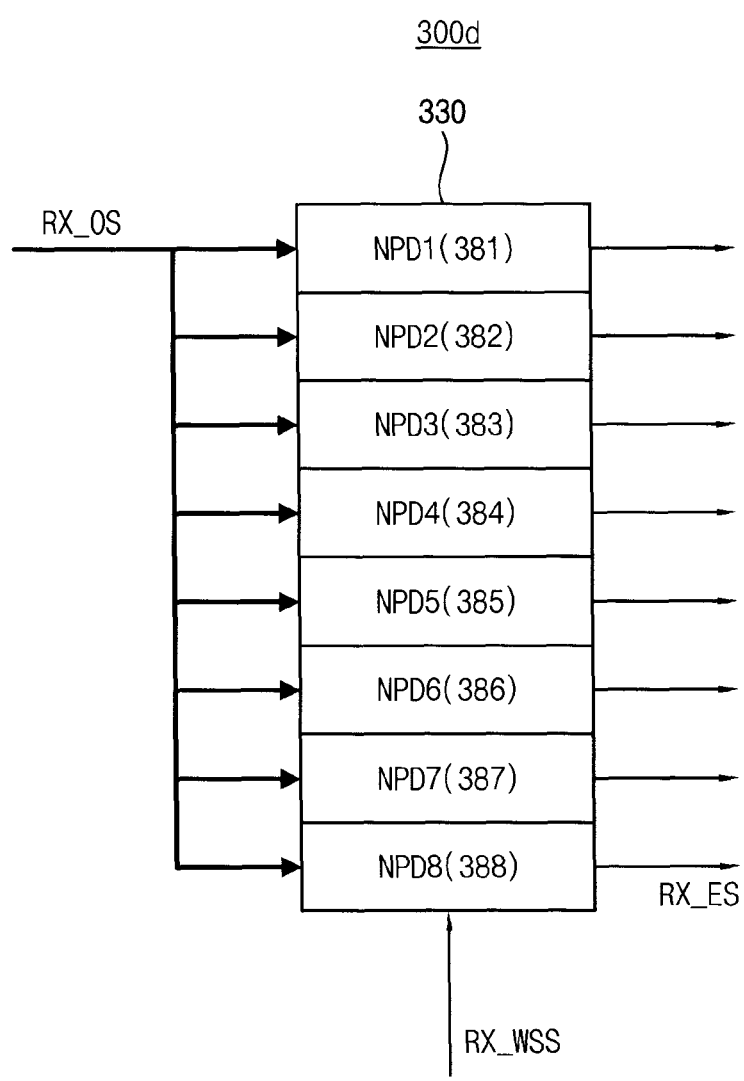
FIG. 19 is a block diagram illustrating still another example of the opto-electrical converter in the optical transmission converter of FIG. 1, according to an embodiment of the inventive concept.
Figure 20:
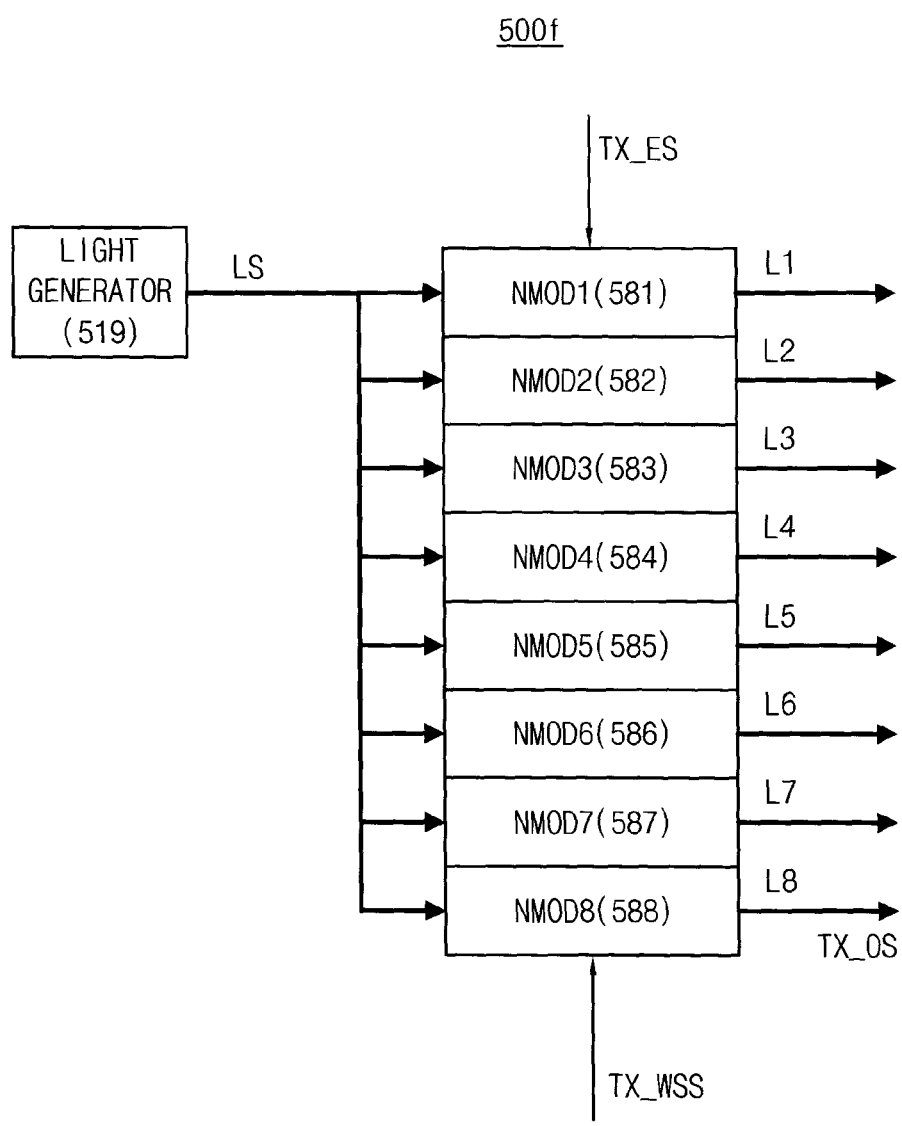
FIG. 20 is a block diagram illustrating still another example of the electro-optical converter in the optical transmission converter of FIG. 1, according to an embodiment of the inventive concept.

FIG. 19 is a block diagram illustrating still another example of the opto-electrical converter in the optical transmission converter of FIG. 1, according to an embodiment of the inventive concept, and FIG. 20 is a block diagram illustrating still another example of the electro-optical converter in the optical transmission converter of FIG. 1, according to an embodiment of the inventive concept.

Referring to FIG. 19, an opto-electrical converter 300d comprises narrow band photodetectors 381 to 388. Narrow band photodetectors 381 to 388 convert a narrow band optical signal of reception optical signal RX_OS to reception electrical signal RX_ES.

Referring to FIG. 20, an electro-optical converter 500f comprises a light generator 519 and a modulation unit 530. Light generator 519 generates multiple light signals, which may be laser signals, for instance. Modulation unit 530 comprises narrow band modulators 581 to 588. Narrow band modulators 581 to 588 modulate transmission electrical signal TX_ES to transmission optical signal TX_OS using narrow band selection light signal SL of the light signals having the wavelengths.

The optical transmission converter selectively receives selection optical signal S_OS that is required in each memory device 600 of reception optical signal RX_OS that is transmitted using the wavelengths. Therefore, data required in each memory device 600 is modulated using each different wavelength. Even though the modulated data using each different wavelength is transmitted from memory controller 400 through the optical channel, each memory device 600 selectively receives the required data based on wavelength control signal CS. Because the modulated data using each different wavelength is transmitted through the optical channel, data transmission speed between memory controller 400 and memory device 600 is increased.

Where the wavelength used in each memory device 600 is different, the optical transmission converter for each wavelength may be required. However, if the above-described optical transmission converter is used, the optical transmission converter for each wavelength may not be required because the wavelength is selected based on reception wavelength selection signal RX_WSS and transmission wavelength selection signal TX_WSS. Therefore the optical transmission converter may be implemented in a relatively efficient manner.

Figure 21:
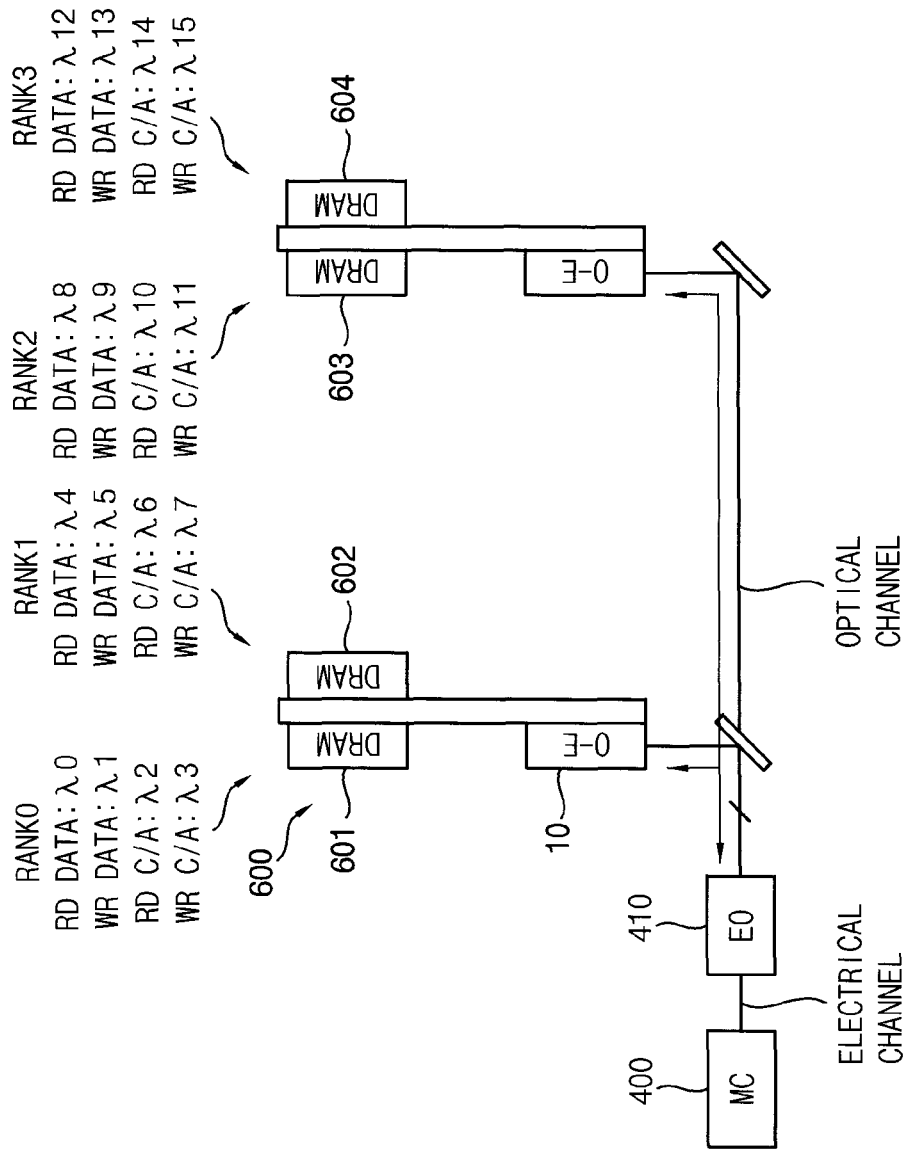
FIG. 21 is a block diagram illustrating a memory system according to an embodiment of the inventive concept.

FIG. 21 is a block diagram illustrating a memory system according to an embodiment of the inventive concept.

Referring to FIG. 21, a memory system comprises the host device and slave devices. The host device may be memory controller 400 and the slave device may be at least one memory device 600. For example, memory controller 400 and memory device 600 may be equipped on a mother board MB. Memory device 600 may be implemented as a memory module. The memory module may be equipped on a socket in mother board MB. Memory controller 400 and memory device 600 may be connected through the optical channel. Memory controller 400 comprises an electro-optical device 410. Electro-optical device 410 converts a command CMD, an address ADDR and data to an optical signal. Each of memory devices 600 comprises an optical transmission converter 10. Memory devices 600 may be a memory device_1_601, a memory device_2_602, a memory device_3_603, and a memory device_4_604.

Optical transmission converter 10 converts the optical signal to an electrical signal. Optical transmission converter 10 includes a wavelength selector 100, an opto-electrical converter 300 and an electro-optical converter 500. Wavelength selector 100 generates a reception wavelength selection signal RX_WSS and a transmission wavelength selection signal TX_WSS in response to a wavelength control signal CS. Wavelength selector 100 controls opto-electrical converter 300 using transmission wavelength selection signal TX_WSS, and it controls electro-optical converter 500 using reception wavelength selection signal RX_WSS. For example, wavelength control signal CS may be received from a CPU, a memory controller or a serial presence detect. Wavelength control signal CS may be transmitted through an electrical channel such as an electrical wire. Wavelength control signal CS may be transmitted through an optical channel such as an optical fiber. Reception wavelength selection signal RX_WSS may be generated based on wavelength control signal CS and a logic circuit in wavelength selector 100. Transmission wavelength selection signal TX_WSS may be generated based on wavelength control signal CS and a logic circuit in wavelength selector 100.

Opto-electrical converter 300 converts a selection optical signal S_OS to a reception electrical signal RX_ES. Selection optical signal S_OS corresponds to a at least one reception selection wavelength based on a reception optical signal RX_OS corresponding to command CMD, address ADDR and the data from a memory controller 400 and reception wavelength selection signal RX_WSS. Reception optical signal RX_OS from memory controller 400 is transmitted through the optical channel. The optical signal comprises optical signals that are modulated with multiple light signals, the light signals having multiple wavelengths. The light signals may be laser signals, for instance. At least one wavelength of the wavelengths may be selected according to reception wavelength selection signal RX_WSS. If the reception selection wavelength is selected based on reception wavelength selection signal RX_WSS, opto-electrical converter 300 may convert selection optical signal S_OS to reception electrical signal RX_ES by selecting selection optical signal S_OS corresponding to the reception selection wavelength of reception optical signal RX_OS.

Electro-optical converter 500 converts a transmission electrical signal TX_ES to a transmission optical signal TX_OS. Transmission optical signal TX_OS corresponds to at least one transmission selection wavelength based on transmission wavelength selection signal TX_WSS and transmission electrical signal TX_ES. At least one wavelength of wavelengths may be selected according to transmission wavelength selection signal TX_WSS. If the transmission selection wavelength is selected based on transmission wavelength selection signal TX_WSS, electro-optical converter 500 may convert transmission electrical signal TX_ES to transmission optical signal TX_OS corresponding to the transmission selection wavelength. Transmission optical signal TX_OS may be transmitted to memory controller 400 through the optical channel.

Optical transmission converter 10 selectively receives selection optical signal S_OS for each memory device 600 of reception optical signal RX_OS that is transmitted using the wavelengths. Therefore, data required in each memory device 600 may be modulated using each different wavelength. Even though the modulated data using each different wavelength is transmitted from memory controller 400 through the optical channel, each memory device 600 may selectively receive the required data based on wavelength control signal CS. Because the modulated data using each different wavelength is transmitted through the optical channel, data transmission speed between memory controller 400 and memory device 600 may be increased.

If the wavelength used in each memory device 600 is different, optical transmission converter 10 for each wavelength may be required. However, if optical transmission converter 10 according to an embodiment of the inventive concept is used, optical transmission converter 10 for each wavelength may not be required because the wavelength is selected based on reception wavelength selection signal RX_WSS and transmission wavelength selection signal TX_WSS. Therefore optical transmission converter 10 may be efficiently implemented.

In certain embodiments, memory devices 600 may be controlled by assigning a different wavelength to each of memory devices 600. For example, lambda 1 wavelength may be assigned to a memory device_1_601. Lambda 2 wavelength may be assigned to a memory device_2_602. Lambda 3 wavelength may be assigned to a memory device_3_603. Lambda 4 wavelength may be assigned to a memory device_4_604. When a wavelength of reception optical signal RX_OS from memory controller 400 is lambda 1, reception optical signal RX_OS may control memory device_1_601. When a wavelength of reception optical signal RX_OS is lambda 2, reception optical signal RX_OS may control memory device_2_602. When a wavelength of reception optical signal RX_OS is lambda 3, reception optical signal RX_OS may control memory device_3_603. When a wavelength of reception optical signal RX_OS is lambda 4, reception optical signal RX_OS may control memory device_4_604.

In some embodiments, memory devices 600 may be controlled by assigning a different wavelength to each of command CMD, address ADDR and data DATA. For example, command CMD may be reception optical signal RX_OS modulated using the lambda 1 wavelength. Address ADDR may be reception optical signal RX_OS modulated using the lambda 2 wavelength. Data DATA may be reception optical signal RX_OS modulated using the lambda 3 wavelength. Each of reception optical signals RX_OS may be transferred to memory device 600. Memory device 600 processes reception optical signal RX_OS modulated using the lambda 1 as command CMD. Memory device 600 processes reception optical signal RX_OS modulated using the lambda 2 as address ADDR. Memory device 600 processes reception optical signal RX_OS modulated using the lambda 3 as the data.

FIG. 22 is a diagram illustrating a data transmission speed according to a number of wavelengths, according to an embodiment of the inventive concept.

Referring to FIG. 22, a number of wavelengths may be changed according to an operating speed of memory system 20. Where the operating speed of a memory device 600 is 1.066 Gb/s, if the number of wavelengths is 6 and a signal of each wavelength is transferred with 11.4 Gb/s, a bandwidth may be 11.4 Gb/s*6=68.4 Gb/s. In this case, if the bandwidth is divided by 64 bits that are data bits for parallel processing, the data may be transferred to memory device 600 with data rate of 68.4 Gb/s/64 bits=1.06 Gb/s. If the number of wavelengths is 9 and a signal of each wavelength is transferred with 11.4 Gb/s, a bandwidth may be 11.4 Gb/s*9=102.6 Gb/s. In this case, if the bandwidth is divided by 64 bits that are data bits for parallel processing, the data may be transferred to memory device 600 with data rate of 68.4 Gb/s/64 bits=1.06 Gb/s. A gear ratio may be a ratio between an optical speed and an electrical speed. Where the number of wavelengths is 6, the gear ratio may be 12:1. Where the number of wavelengths is 6, the gear ratio may be 8:1. As a result, the number of wavelengths may be changed according to an operating speed of memory system 20.

FIG. 23 is a block diagram illustrating a computing system incorporating a memory system according to an embodiment of the inventive concept.

Referring to FIG. 23, a computing system 800 comprises a processor 810, an input/output hub (IOH) 820, an input/output controller hub (ICH) 830, at least one memory module 840 and a graphics card 850. Computing system 800 may be, for instance, a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

Processor 810 may perform various computing functions, such as executing software for performing desired calculations or tasks. For example, processor 810 may be a microprocessor, a central process unit (CPU), a digital signal processor, or the like. In various alternative embodiments, processor 810 may include a single core or multiple cores. For example, processor 810 may be a multi-core processor, such as a dual-core processor, a quad-core processor, a hexa-core processor, etc. In some embodiments, computing system 800 comprises multiple processors. Processor 810 may include an internal or external cache memory.

Processor 810 comprises a memory controller 811 for controlling operations of memory module 840. Memory controller 811 in processor 810 may be referred to as an integrated memory controller (IMC). A memory interface between memory controller 811 and memory module 840 may be implemented with a single channel including multiple signal lines, or may bay be implemented with multiple channels, to each of which at least one memory module 840 may be coupled. In some embodiments, memory controller 811 may be located inside input/output hub 820, which may be referred to as memory controller hub (MCH).

Input/output hub 820 may manage data transfer between processor 810 and devices, such as graphics card 850. Input/output hub 820 may be coupled to processor 810 via various interfaces. For example, the interface between processor 810 and input/output hub 820 may be a front side bus (FSB), a system bus, a HyperTransport, a lightning data transport (LDT), a QuickPath interconnect (QPI), a common system interface (CSI), etc. In some embodiments, computing system 800 may include multiple input/output hubs. Input/output hub 820 may provide various interfaces with the devices. For example, input/output hub 820 may provide an accelerated graphics port (AGP) interface, a peripheral component interface-express (PCIe), a communications streaming architecture (CSA) interface, etc.

Graphics card 850 may be coupled to input/output hub 820 via AGP or PCIe. Graphics card 850 may control a display device (not shown) for displaying an image. Graphics card 850 may include an internal processor for processing image data and an internal memory device 600. In some embodiments, input/output hub 820 may include an internal graphics device along with or instead of graphics card 850 outside graphics card 850. The graphics device in input/output hub 820 may be referred to as integrated graphics. Further, input/output hub 820 including the internal memory controller and the internal graphics device may be referred to as a graphics and memory controller hub (GMCH).

Input/output controller hub 830 may perform data buffering and interface arbitration to efficiently operate various system interfaces. Input/output controller hub 830 may be coupled to input/output hub 820 via an internal bus, such as a direct media interface (DMI), a hub interface, an enterprise Southbridge interface (ESI), PCIe, etc. Input/output controller hub 830 may provide various interfaces with peripheral devices. For example, input/output controller hub 830 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, processor 810, input/output hub 820 and input/output controller hub 830 may be implemented as separate chipsets or separate integrated circuits. In other embodiments, at least two of processor 810, input/output hub 820 and input/output controller hub 830 may be implemented as a single chipset.

Various embodiments of the inventive concept may be applied to systems such as be a mobile phone, a smart phone, a personal digital assistant (PDA), a portable multimedia player (PMP), a digital camera, a music player, a portable game console, a navigation system, etc.

An optical transmission converter as described above may selectively receive the selection optical signal that is required in each memory device of the reception optical signal that is transmitted using the wavelengths. Therefore, data required in each memory device may be modulated using each different wavelength. Even though the modulated data using each different wavelength is transmitted from the memory controller through the optical channel, each memory device may selectively receive the required data based on wavelength control signal CS. Because the modulated data using each different wavelength is transmitted through the optical channel, data transmission speed between the memory controller and the memory device may be increased.

Where the wavelength used in each memory device is different, the optical transmission converter for each wavelength may be required. However, if the optical transmission converter according to an embodiment of the inventive concept is used, the optical transmission converter for each wavelength may not be required because the wavelength is selected based on the reception wavelength selection signal and the transmission wavelength selection signal. Therefore the optical transmission converter may be efficiently implemented.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. An optical transmission converter, comprising:
   a wavelength selector configured to output a reception wavelength selection signal and a transmission wavelength selection signal in response to a wavelength control signal;
   an opto-electrical converter configured to convert a selection optical signal into a reception electrical signal based on a reception optical signal from a host device and the reception wavelength selection signal; and
   an electro-optical converter configured to convert a transmission electrical signal into a transmission optical signal based on the transmission wavelength selection signal and the transmission electrical signal.

2. The optical transmission converter of claim 1, wherein the opto-electrical converter comprises:
   an optical signal selection unit configured to output the selection optical signal from the reception optical signal based on the reception wavelength selection signal; and
   an opto-electrical converting unit configured to convert the selection optical signal to the reception electrical signal; and
   wherein the electro-optical converter comprises:
   a light signal selection unit configured to output a selection light signal based on the transmission wavelength selection signal; and
   a modulation unit configured to output the transmission optical signal by modulating the transmission electrical signal using the selection light signal.

3. The optical transmission converter of claim 2, wherein the optical signal selection unit comprises a reception tunable filter configured to control a reception filtering wavelength to match a reception selection wavelength of the selection optical signal, and further configured to output the selection optical signal by filtering the reception optical signal, and
   wherein the light signal selection unit comprises a tunable light signal generator configured to output the selection light signal by controlling a transmission filtering wavelength to match the transmission selection wavelength of the transmission optical signal.

4. The optical transmission converter of claim 2, wherein the light signal selection unit comprises:
   a light generator configured to output multiple light signals having multiple wavelengths; and
   a transmission tunable filter configured to control a transmission filtering wavelength to match the transmission selection wavelength of the transmission optical signal, and further configured to output the selection light signal by filtering the light signals selectively.

5. The optical transmission converter of claim 4, wherein the light signal selection unit comprises:
   a transmission tunable filter configured to receive multiple light signals having multiple wavelengths from a light generator disposed outside of the optical transmission converter, control a transmission filtering wavelength to match a transmission selection wavelength of the transmission optical signal, and configured to output the selection light signal by filtering the light signals selectively.

6. The optical transmission converter of claim 2, wherein the optical signal selection unit comprises multiple reception fixed-wavelength filters configured to output fixed-wavelength optical signals corresponding to fixed-wavelengths by filtering the reception optical signal, and wherein the selection optical signal is generated by activating or deactivating the reception fixed-wavelength filters according to the reception wavelength selection signal.

7. The optical transmission converter of claim 2, wherein the light signal selection unit comprises multiple transmission fixed-wavelength filters configured to output fixed-wavelength light signals corresponding to fixed-wavelengths by filtering light signals, and wherein the selection light signal is generated by activating or deactivating the transmission fixed-wavelength filters according to the transmission wavelength selection signal.

8. The optical transmission converter of claim 2, wherein the optical signal selection unit comprises multiple reception fixed-wavelength filters configured to output fixed-wavelength optical signals corresponding to fixed-wavelengths by filtering the reception optical signal, wherein the at least one selection optical signal is generated by activating or deactivating the reception fixed-wavelength filters according to the reception wavelength selection signal, and wherein the opto-electrical converting unit concurrently outputs the at least one reception electrical signal by converting the at least one selection optical signal.

9. The optical transmission converter of claim 2, wherein the light signal selection unit comprises multiple transmission fixed-wavelength filters configured to output fixed-wavelength light signals corresponding to fixed-wavelengths by filtering light signals, wherein the at least one selection light signal is generated by activating or deactivating the transmission fixed-wavelength filters according to the transmission wavelength selection signal, and wherein the modulation unit concurrently outputs the at least one transmission optical signal by modulating the transmission electrical signal using the at least light signal.

10. The optical transmission converter of claim 2, wherein the light signal selection unit includes at least one fixed-wavelength light generator, and wherein the modulation unit concurrently outputs the at least one transmission optical signal by modulating the transmission electrical signal using a fixed-wavelength light signal of the at least one fixed-wavelength light generator.

11. The optical transmission converter of claim 1, wherein the reception optical signal and the transmission optical signal are transmitted through a bi-directional channel.

12. A memory system comprising:
a host device comprising an electro-optical converting device that converts a command, an address, and data to an optical signal; and
multiple slave devices comprising an optical transmission converter that converts the optical signal to an electrical signal,
wherein the optical transmission converter comprises:
a wavelength selector that outputs a reception wavelength selection signal and a transmission wavelength selection signal in response to a wavelength control signal;
an opto-electrical converter that converts a selection optical signal to a reception electrical signal based on a reception optical signal corresponding to the command, the address and the data from a host device and the reception wavelength selection signal; and
an electro-optical converter that converts a transmission electrical signal to a transmission optical signal based on the transmission wavelength selection signal and the transmission electrical signal.

13. The memory system of claim 12, wherein the slave devices are controlled by assigning a different wavelength to each of the slave devices.

14. The memory system of claim 12, wherein the slave devices are controlled by assigning a different wavelength to each of the command, the address and the data.

15. The memory system of claim 12, wherein a number of wavelengths is changed according to an operating speed of the memory system.

16. A method, comprising:
outputting, by a wavelength selector, a reception wavelength selection signal and a transmission wavelength selection signal in response to a wavelength control signal;
converting, by an opto-electrical converter, a selection optical signal into a reception electrical signal based on a reception optical signal from a host device and the reception wavelength selection signal; and
converting, by an electro-optical converter, a transmission electrical signal into a transmission optical signal based on the transmission wavelength selection signal and the transmission electrical signal.

17. The method of claim 16, further comprising:
outputting, by an optical signal selection unit in the opto-electrical converter, the selection optical signal from the reception optical signal based on the reception wavelength selection signal; and
converting, by an opto-electrical converting unit in the opto-electrical converter, the selection optical signal to the reception electrical signal,
wherein the electro-optical converter comprises:
a light signal selection unit that outputs a selection light signal based on the transmission wavelength selection signal; and
a modulation unit that produces the transmission optical signal by modulating the transmission electrical signal using the selection light signal.

18. The method of claim 17, further comprising controlling, by a reception tunable filter in the optical signal selection unit, a reception filtering wavelength to match a reception selection wavelength of the selection optical signal, and generating, by the reception tunable filter, the selection optical signal by filtering the reception optical signal,
wherein the light signal selection unit comprises a tunable light signal generator that outputs the selection light signal by controlling a transmission filtering wavelength to match the transmission selection wavelength of the transmission optical signal.

19. The method of claim 17, wherein the light signal selection unit comprises a light generator that outputs multiple light signals having multiple wavelengths, and a transmission tunable filter that controls a transmission filtering wavelength to match the transmission selection wavelength of the transmission optical signal, and outputs the selection light signal by filtering the light signals selectively.

20. The method of claim 19, wherein the light signal selection unit comprises a transmission tunable filter that receives multiple light signals having multiple wavelengths from a light generator disposed outside of the optical transmission converter, controls a transmission filtering wavelength to match a transmission selection wavelength of the transmission optical signal, and outputs the selection light signal by filtering the light signals selectively.

* * * * *